US011132758B2

(12) United States Patent
Hoarty et al.

(10) Patent No.: US 11,132,758 B2
(45) Date of Patent: Sep. 28, 2021

(54) EMBEDDING DATA IN VIDEO WITHOUT VISIBLE IMPAIRMENTS

(71) Applicant: INSCAPE DATA, INC., Irvine, CA (US)

(72) Inventors: W. Leo Hoarty, Morgan Hill, CA (US); Zeev Neumeier, Berkeley, CA (US)

(73) Assignee: INSCAPE DATA, INC., Irvine, CA (US)

(*) Notice: Subject to any disclaimer, the term of this patent is extended or adjusted under 35 U.S.C. 154(b) by 0 days.

(21) Appl. No.: 16/436,600

(22) Filed: Jun. 10, 2019

(65) Prior Publication Data
US 2019/0295208 A1 Sep. 26, 2019

Related U.S. Application Data

(63) Continuation-in-part of application No. 15/704,242, filed on Sep. 14, 2017, now Pat. No. 10,360,651.

(60) Provisional application No. 62/394,390, filed on Sep. 14, 2016.

(51) Int. Cl.
| | |
|---|---|
| *G06T 1/00* | (2006.01) |
| *H04N 5/913* | (2006.01) |
| *G09G 3/00* | (2006.01) |
| *G09G 5/10* | (2006.01) |
| *H04N 19/467* | (2014.01) |

(52) U.S. Cl.
CPC ........... *G06T 1/0071* (2013.01); *G09G 3/007* (2013.01); *G09G 3/008* (2013.01); *G09G 5/10* (2013.01); *H04N 5/913* (2013.01); *H04N 19/467* (2014.11); *G06T 2201/0061* (2013.01); *H04N 2005/91335* (2013.01)

(58) Field of Classification Search
None
See application file for complete search history.

(56) References Cited

U.S. PATENT DOCUMENTS

| | | | |
|---|---|---|---|
| 6,222,932 B1 * | 4/2001 | Rao | G06T 1/0028 380/54 |
| 7,154,560 B1 | 12/2006 | Chang | |
| 7,197,164 B2 | 3/2007 | Levy | |

(Continued)

FOREIGN PATENT DOCUMENTS

GB 2526148 * 11/2015

OTHER PUBLICATIONS

IN2153DE2006A Method and system for creating digital content to reconstruct a video frame, English ; Anurag Goel et al. Earliest Priority Date: Sep. 28, 2006 (Year: 2006).*

(Continued)

*Primary Examiner* — Nancy Bitar
(74) *Attorney, Agent, or Firm* — Polsinelli LLP

(57) ABSTRACT

Methods, devices, and computer-program products are provided for adding data to a digital video signal in a visually imperceptible manner. For example, a region of pixels can be identified in a video frame, and one or more pixel characteristics of the region of pixels can be determined. Based on the one or more pixel characteristics of the region of pixels, at least one pixel characteristic of a subset of pixels from the region of pixels can be modified in order to encode a set of data into the region of pixels. An output frame can be provided that includes the modified at least one pixel characteristics for the subset of pixels.

18 Claims, 22 Drawing Sheets

(56) References Cited

U.S. PATENT DOCUMENTS

| | | | |
|---|---|---|---|
| 8,861,922 B2 | 10/2014 | Zarrabizadeh | |
| 9,922,390 B2* | 3/2018 | Beaubien | G06T 1/0028 |
| 10,313,692 B2* | 6/2019 | Liu | H04N 19/132 |
| 10,360,651 B1* | 7/2019 | Hoarty | G06T 1/0064 |
| 2005/0069168 A1* | 3/2005 | Zarrabizadeh | H04N 1/32309 |
| | | | 382/100 |
| 2013/0188824 A1* | 7/2013 | Hou | H04N 1/32251 |
| | | | 382/100 |
| 2014/0147041 A1* | 5/2014 | Brown | H04N 1/6027 |
| | | | 382/167 |
| 2015/0324948 A1* | 11/2015 | Cain | H04N 1/32309 |
| | | | 382/100 |
| 2016/0261874 A1* | 9/2016 | Chong | H04N 19/117 |
| 2017/0026600 A1* | 1/2017 | Noh | H04N 9/04557 |
| 2018/0253826 A1* | 9/2018 | Milanfar | G06T 3/40 |
| 2019/0306480 A1* | 10/2019 | Talagala | G06T 3/4015 |
| 2019/0347956 A1* | 11/2019 | Daga | G09B 19/0038 |

OTHER PUBLICATIONS

Non-Final Office Action dated Sep. 19, 2018 for U.S. Appl. No. 15/704,242; 7 pages.

Notice of Allowance dated Mar. 11, 2019 for U.S. Appl. No. 15/704,242; 9 pages.

* cited by examiner

[0,0]

[0,1]

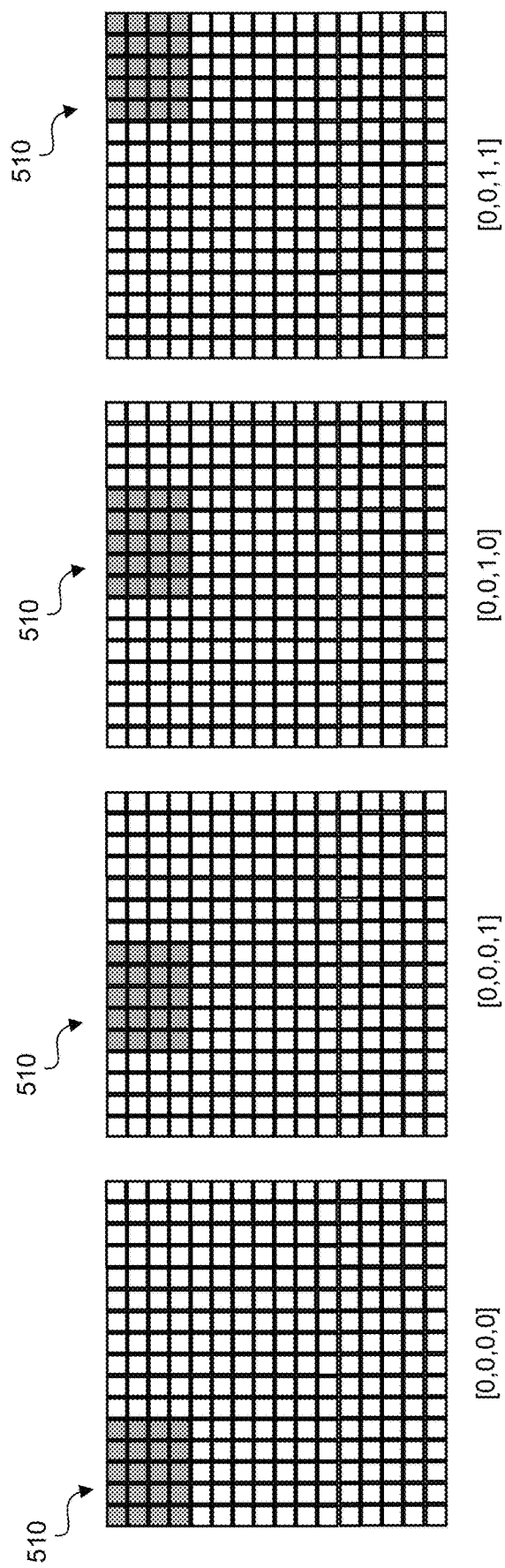

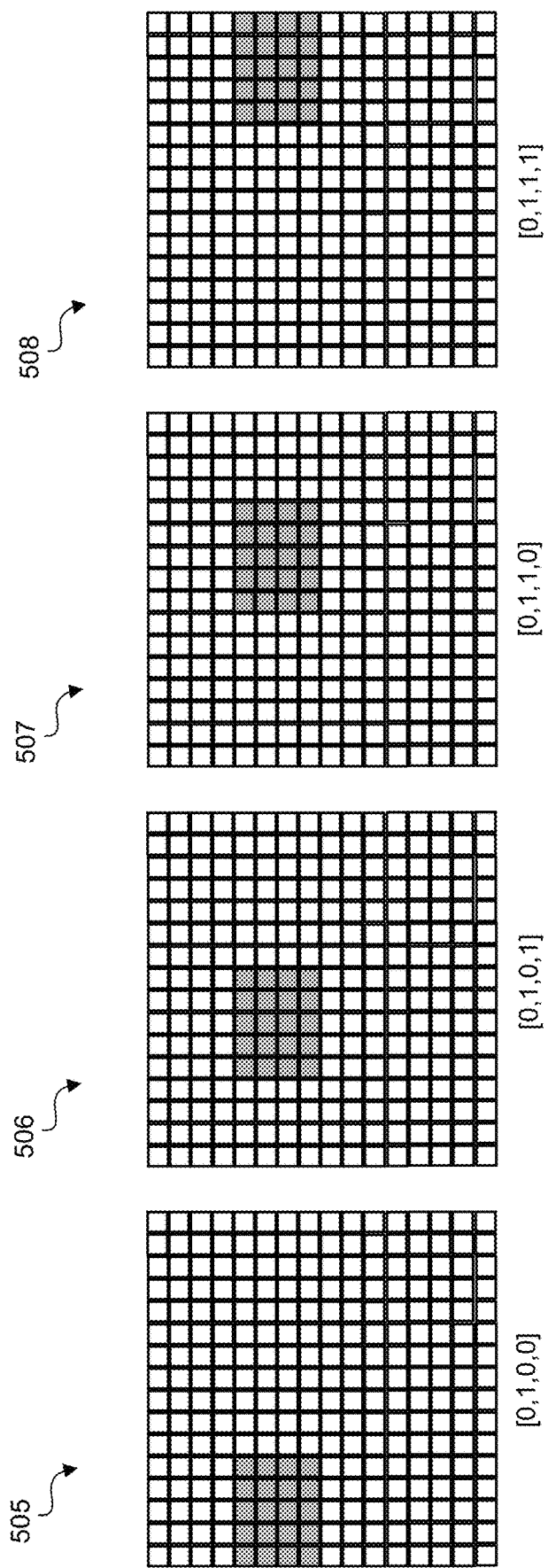

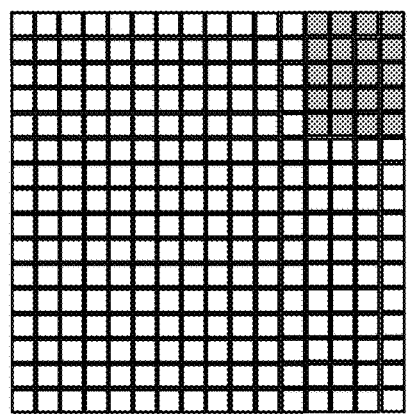
FIG. 5P [1,1,1,1]
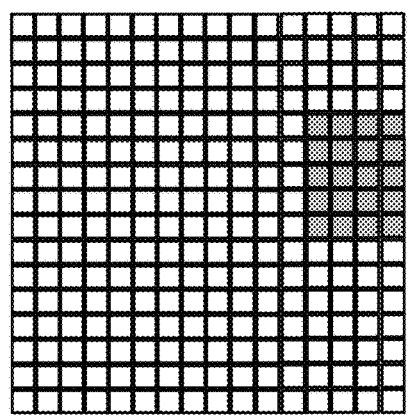
FIG. 5O [1,1,1,0]
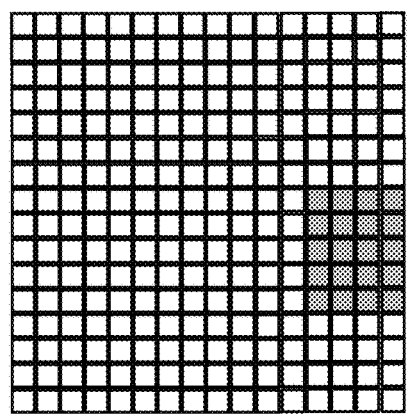
FIG. 5N [1,1,0,1]
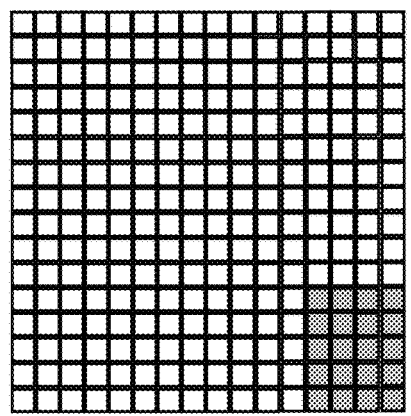
FIG. 5M [1,1,0,0]

EMBEDDING DATA IN VIDEO WITHOUT VISIBLE IMPAIRMENTS

CROSS-REFERENCE TO RELATED APPLICATIONS

This application is a continuation-in-part of U.S. application Ser. No. 15/704,242, filed on Sep. 14, 2017, which claims the benefit of and priority to U.S. Provisional Patent Application No. 62/394,390, filed on Sep. 14, 2016, the contents of which are hereby expressly incorporated by reference in their entirety.

FIELD

This application is generally related to embedding data into a digital video signal without visually impairing the signal, in order to provide a means for conveying additional information with the video signal.

BACKGROUND

Watermarking includes embedding data in digital video content to enable a media device to extract the embedded data from the video (e.g., being displayed). While certain standards (e.g., the Advanced Television Systems Committee (ATSC) A/335 standard) may support a video watermark, the data would be slightly or even highly visible in the displayed content, and therefore may lead to viewer complaints if widely used. Hence, there is a need for a better solution for video watermarking.

SUMMARY

This application relates generally to systems and techniques for embedding data into a digital video signal without visually impairing the signal, in order to provide a means for conveying additional information with the video signal. For example, the systems and techniques can embed (and hide) the data within one or more regions in a video frame. The additional information can be related to the video in which the data is embedded, can be used to trigger the substitution of alternate content to a viewer of the video, and/or can provide other information. The embedded data can also be quickly decoded by a media device or other device with video decoding capabilities.

The systems and techniques can hide data within video frames such that it is not visible to a viewer of the video content. A data signal can be hidden within any portion of a video frame in a manner that it can carry sufficient information for a variety of uses, and be rapidly decoded so that it is useful for triggering tightly-timed events within a receiving device or system. It is through novel applications of colorimetry and other processes that the techniques described here are able to embed data anywhere in the visible portion of a video frame. In some examples, the data can be embedded in the video by defining a plurality of target regions or areas throughout the video frame. These target areas can be small areas (e.g., an area of 10×6, 12×10, or 16×16 width by height pixel blocks) within the video frame. One of ordinary skill will appreciate that the size of a target area can be adjusted to suit the application. The video within the target area can be measured for one or more pixel characteristics (e.g., hue, saturation, and/or lightness). Based on the detected pixel characteristic(s), a subset of the pixels in the target area can be shifted to altered pixel characteristics (e.g., a modified hue, saturation, and/or lightness) such that the shift is unobjectionable or undetectable by human visual perception. In some examples, the shifting of the pixel characteristics can be performed in two or more steps, creating a gradient further obscuring the visual presence of the data being embedded into the video.

In some implementations, a technique can be performed to cloak the embedded data pixels by shifting, over a number of frames (e.g., frame-by-frame), the altered data block such that the change in pixel characteristics (e.g., hue, saturation, and/or lightness) is constantly moving to further avoid any possibility of creating a fixed pattern to which the human eye could be sensitive.

According to at least one example, a method of processing video data is provided. The method includes obtaining a video frame. The method further includes identifying a region of pixels of the video frame, and determining one or more pixel characteristics of the region of pixels. The method further includes modifying, based on the one or more pixel characteristics of the region of pixels, at least one pixel characteristic of a subset of pixels from the region of pixels. The modified at least pixel characteristic of the subset of pixels encodes a set of data into the region of pixels. The method further includes generating an output frame including the modified at least one pixel characteristics for the subset of pixels.

In another example, an apparatus for processing video data is provided that comprises one or more processors implemented in circuitry and a non-transitory machine-readable storage medium. The non-transitory machine-readable storage medium includes instructions, which when executed on the one or more processors, cause the one or more processors to perform operations including: obtaining a video frame; identifying a region of pixels of the video frame; determining one or more pixel characteristics of the region of pixels; modifying, based on the one or more pixel characteristics of the region of pixels, at least one pixel characteristic of a subset of pixels from the region of pixels, wherein the modified at least pixel characteristic of the subset of pixels encode a set of data into the region of pixels; and generating an output frame including the modified at least one pixel characteristics for the subset of pixels.

In another example, a non-transitory computer-readable medium is provided that has stored thereon instructions that, when executed by one or more processors, cause the one or more processor to: obtain a video frame; identifying a region of pixels of the video frame; determine one or more pixel characteristics of the region of pixels; modify, based on the one or more pixel characteristics of the region of pixels, at least one pixel characteristic of a subset of pixels from the region of pixels, wherein the modified at least pixel characteristic of the subset of pixels encode a set of data into the region of pixels; and generate an output frame including the modified at least one pixel characteristics for the subset of pixels.

In another example, an apparatus for processing video data is provided. The apparatus includes means for obtaining a video frame. The apparatus further includes means for identifying a region of pixels of the video frame, and means for determining one or more pixel characteristics of the region of pixels. The apparatus further includes means for modifying, based on the one or more pixel characteristics of the region of pixels, at least one pixel characteristic of a subset of pixels from the region of pixels. The modified at least pixel characteristic of the subset of pixels encodes a set of data into the region of pixels. The apparatus further includes means for generating an output frame including the modified at least one pixel characteristics for the subset of pixels.

In some aspects, the one or more pixel characteristics include at least one of a hue, a saturation, or a lightness of the region of pixels.

In some aspects, the one or more pixel characteristics include a hue, a saturation, and a lightness of the region of pixels.

In some aspects, the at least pixel characteristic of the subset of pixels includes at least one of a hue, a saturation, or a lightness of the region of pixels.

In some aspects, the at least pixel characteristic of the subset of pixels includes a hue, a saturation, and a lightness of the region of pixels.

In some aspects, the methods, apparatuses, and computer-readable medium described above for processing video data further comprise: determining an average of the one or more pixel characteristics of the region of pixels; scaling the averaged one or more pixel characteristics to obtain a scaled value; and determining, using the scaled value, an amount to modify the at least one pixel characteristic of the subset of pixels from the region of pixels, wherein the at least one pixel characteristic of the subset of pixels is modified by the determined amount.

In some aspects, at least pixel characteristic of an additional subset of pixels from an additional region of pixels in a subsequent video frame are modified to encode the set of data into the additional region of pixels. The subsequent video frame has an output order after the video frame. In such aspects, the additional region of pixels in the subsequent video frame is a different region than the region of pixels of the video frame.

In some aspects, the methods, apparatuses, and computer-readable medium described above for processing video data further comprise: obtaining a subsequent video frame, the subsequent video frame having an output order after the video frame; identifying an additional region of pixels of the subsequent video frame, wherein the additional region of pixels is a different region than the region of pixels of the video frame; determining one or more pixel characteristics of the additional region of pixels; modifying, based on the one or more pixel characteristics of the additional region of pixels, at least one pixel characteristic of an additional subset of pixels from the additional region of pixels, wherein the modified at least pixel characteristic of the additional subset of pixels encodes the set of data into the additional region of pixels; and generating an additional output frame including the modified at least one pixel characteristics for the additional subset of pixels.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing.

DETAILED DESCRIPTION

Figure 1:
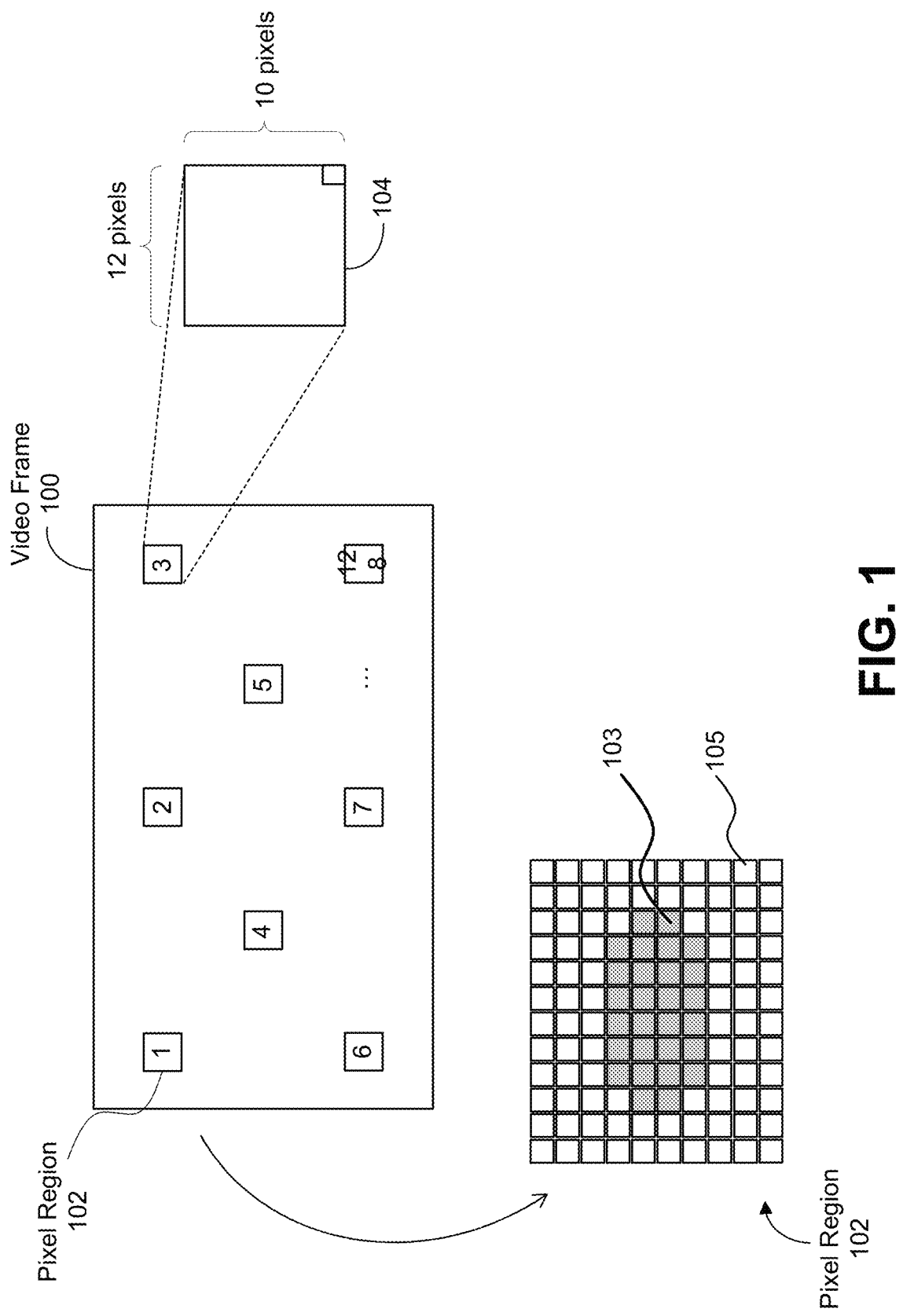
FIG. 1 is a diagram illustrating a block diagram showing an example video frame containing a plurality of pixel patches, in accordance with some examples provided herein.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

This application relates generally to embedding data into a digital video signal without visually impairing the signal in order to provide a means for conveying additional information that is typically related to the video in which the data is embedded, or triggering the substitution of alternate content to the viewer.

"Watermarking" can be added to digital video content in such a way that the displayed video is not altered in a perceptually noticeable manner, yet still enables the receiving device (e.g., a television system, set-top box, mobile device, computer, or other receiving device) to extract data embedded in the video being displayed. "Digital watermarking" is a term that originally described a technique for hiding certain identification data regarding the origin of a digital media stream. Digital watermarks were embedded in an image file or video frames in a way that inhibited their removal without also destroying the underlying content. When such watermarked digital content is distributed on-line or recorded on media, the data reflecting the content's origination travels with it, which enables the originator to demonstrate the source and possible ownership of the content. Digital watermarking can also be used for triggering events (e.g., for interactive television) as well as for dynamic content substitution.

In the original cathode ray tube (CRT)-based television sets common in the analog TV era, a displayed image was transmitted in rows of lines in which black to white (and later color) were displayed as it was projected onto the phosphors coating the inside of the CRT. These lines were repeated as interlaced frames where the frames were separated by a few dozen lines which did not display, and were therefore called the "vertical blanking interval" or VBI. The VBI was used to allow the CRT to move its beam from the bottom scan back to the top and settle down before beginning the scan of another frame of video.

Technologies that embedded information in the VBI lines were developed. Some of the more common uses included closed-captioning text for the hearing impaired, as well as train schedules for videotext display. However, with the advent of digital televisions, there was no need for a VBI since the modern digital television standard includes a separate data stream interwoven with the audio and video data. However, this existing data path is not accessible to a receiving device that is connected to a cable or satellite set-top box, and so alternative approaches for inserting additional information have been proposed.

The committee that developed the current digital television standards is called the Advanced Television Standards Committee, or ATSC, which has devised three generations of its various standards since the launch of digital TV in 2006. ATSC is comprehensive and accounts for a wide variety of uses of a digital television signal extending to non-television set devices such as mobile phones and tablets. In addition to audio and video data, the standard also provides a data path for control and metadata information that is not directly displayed. This information includes details about the program, its episode number, its actors, director, etc. The standard further incorporates information in this embedded data path such as closed-captioned text for the hearing impaired. The standard provides far more flexibility in conveying data to a television receiver than what the now obsolete analog television standard's vertical blanking interval could have ever provided.

Despite the extensive capability for conveying data signals to a television system, the ATSC committee also devised and publish a video and audio watermarking system. This was in recognition of the fact the data channel of the digital TV signal is not synchronized closely enough for trigging very time-sensitive events inside a receiving set-top box or network-connected television (TV) (or so-called "smart TV"), such as pop-up data windows providing additional information about a product being displayed. An even more precise timing requirement would be needed for alternative content substitution where the alternative content might be cached locally in a TV set-top box, smart TV, or other receiving device. In this mode, the receiving device can continuously search the displaying video for the presence of a watermark signal in the appropriate locations and when found, decode the signal. If the conditions are correct, the receiving device can stop displaying the current video information, and can substitute the locally-stored video information; substituting one set of content for another set of alternative content.

In the most recent standard released in 2018, the ATSC committee published a video watermarking standard, A/335, which employs the top two lines of the video frame to carry data. For example, a digital watermark can be embedded on the top lines (e.g., the top two lines) of a video frame. FIG. 1 is a diagram from the ATSC Video Watermark Standard A/335 showing a video frame 101 with data 102 embedded in the top lines of the display using the specified two-level watermark standard. Such an approach is reliant on television displays continuing to employ what is known in the industry as overscan. Overscan is where the video frame is made larger than the display area such that the top and bottom few lines of video are not displayed forming a quasi-vertical blanking interval. For example, the committee relied on the fact that most high-definition televisions (HDTVs) employed overscan (where the top and bottom few lines of video were off-screen), somewhat of a throw-back to the NTSC analog TV days of the VBI. Because in overscan the top few lines are not displayed, the data added to the top lines of a video frame is not visible when the video frame is displayed. A shortcoming of this approach is that a significant percentage of contemporary television sets no longer apply overscan to the video frame. For example, most TV brands in service today do not overscan, especially the latest 4K TVs, since it was noted that overscan reduced sharpness by slightly enlarging the video frame and one of the benefits of the high resolution 4K displays focuses on perceived sharpness. Without overscan, the watermark data embedded in the top two lines of the video frame can be visible (e.g., as a flickering signal as video frames are displayed). The flickering signal of the embedded data can be distracting or annoying to a viewer.

However, that proposed watermarking approach from ATSC A/335 has not been adopted in practice for numerous reasons, one being that the additional information creates on-screen artifacts that are visible to the viewer (e.g., based on the overscan issue noted above). So, while the ATSC A/335 standard supports a video watermark, it would be slightly or even very visible to the human eye, and therefore likely lead to viewer complaints if widely used. Another limitation of the ATSC media watermarking standard, A/335, is that the audio watermarking takes too long to decode to use for a media substitution signal when intended to be used, for example, to trigger the dynamic content substitution feature for providing alternative content, as described above. As noted above, the video watermark standard also suffers from the fact that it is now often visible at the top of the display. There is a need for a better solution for video watermarking that provides embedded or additional data in the video data, but without being perceptible by the human eye when viewing the video data.

Systems, apparatuses, methods, and computer-readable media are described herein for providing a watermarking approach that can embed digital data directly onto a digital image in such a manner as to enable the data to be rapidly decoded, yet still be invisible to the human eye. For example, the techniques described herein can embed additional into an original video data stream in such a manner that it remains imperceptible to the viewer, yet it can provide the CPU, or other information processing apparatus in a receiving device, with additional information about the specific content running at that moment. As used here, a receiving device can include any device that can receive, process, and/or display video data. For example, a receiving device can include a display device (e.g., a television, a network-connected or smart television, a mobile device, a computer, a tablet computer, a head-mounted display (HMD) for virtual reality content, a heads-up display (HUD), or other suitable display device), a video processing device (e.g., a set-top box, a computer, a server, or other suitable video processing device), or other receiving device. In some cases, the receiving device can process the video data and display the video data (e.g., in the case of a smart TV). In some cases, the receiving device can receive and process the video data (e.g., a set-top box, a server, or the like), and can provide the processed video data to another receiving device (e.g., a mobile device, smart television, or the like).

The additional information added to the video stream might include, by way of example only and without limitation, background information on the displayed video, commercial messages associated with the video content being displayed at that moment. Other uses of the additional data include providing a trigger signal at the start of a television commercial to allow the receiving device to detect the signal and substitute an advertisement stored locally in the receiving device memory, or display video information from a server source on the Internet or other network.

In some implementations, the systems, apparatuses, methods, and computer-readable media described herein can embed data within one or more regions of a video frame. For example, a data signal can be hidden within any portion of a video frame in a manner that it can carry sufficient information for a variety of uses, and be rapidly decoded so that it is useful for triggering tightly-timed events within a receiving device or system. The additional information can be related to the video in which the data is embedded, can be used to trigger the substitution of alternate content to a viewer of the video, and/or can provide other information.

As described in more detail below, novel applications of colorimetry and other processes are provided that allow the data to be embedded anywhere in the visible portion of a video frame. For instance, the data can be embedded in the video by defining a plurality of target regions (also referred to as target areas) throughout the video frame. A target region can be a small area of a video frame, such as a 10×6, 12×10, or 16×16 width by height pixel blocks within the video frame. A target region can include any suitable area, and one of ordinary skill will appreciate that the size of a target region can be adjusted to suit the application. The pixels within a target region can be measured for one or more pixel characteristics. In some examples, the one or more pixel characteristics can include hue, saturation, and/or lightness. Based on the detected one or more pixel characteristics of the pixels within the target region, modified pixel characteristics (e.g., a modified hue, saturation, and/or lightness) can be determined for a subset of pixels in the target region such that the modified characteristics are undetectable by human visual perception. In some examples, the shifting of the pixel characteristics can be performed in two or more steps, creating a gradient further obscuring the visual presence of the data being embedded into the video.

To better describe the process of color shifting in a minimally visible manner, a background of various color spaces are described, including the the HSL (hue, saturation, lightness) and HSV (hue, saturation, value) color spaces. HSL and HSV are alternative representations of the RGB color model. Contemporary color space models were designed in the 1970s by the computer graphics industry to more closely align with the way human vision perceives color attributes. In these models, colors of each hue are arranged in a radial slice, around a central axis of neutral colors which ranges from black at the bottom to white at the top. The HSL color space models the way physical paint in different colors mix together, with the saturation dimension resembling various shades of brightly colored paint, and the lightness dimension resembling the mixture of those paints with varying amounts of black or white paint. The HSL model attempts to resemble more perceptual color models such as the Natural Color System (NC S) or Munsell color system, placing fully-saturated colors around a circle at a lightness value of one-half, where a lightness value of 0 or 1 is fully black or white, respectively.

Figures 7A, 7B:
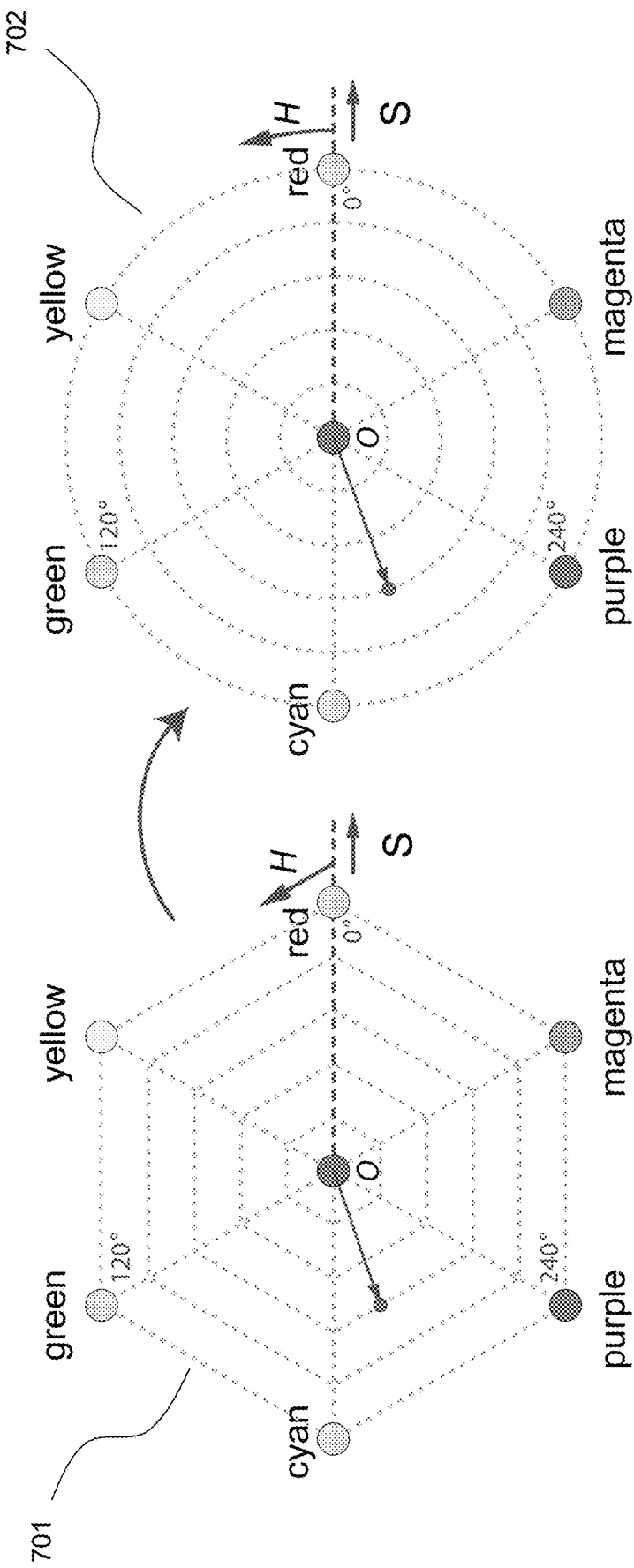
FIG. 7A and FIG. 7B are diagrams illustrating the effect of the mathematical representation of the hue, saturation, and lightness (HSL) color representation, in accordance with some examples provided herein.

The principle of the HSL and HSV color spaces will now be described. FIG. 7A and FIG. 7B are diagrams illustrating the effect of the mathematical representation of HSL transforming the hexagonal representation 701 of the color space into a circular representation 702. As shown in FIG. 8A, HSL (represented by cylinder 801) is a cylindrical geometry. HSV is also a cylindrical geometry. With reference to FIG. 8A, hue 803 (the angular dimension in both color spaces represented by the "hue" arrow in FIG. 8A) starts at the red primary at 0°, passes through the green primary at 120° and the blue primary at 240°, and then wraps back to red at 360°. In each geometry, the central vertical axis comprises the neutral, achromatic, or gray colors, ranging from black at lightness 805 of 0% (value 0) at the bottom of the cylinder, to white at lightness 805 of 100% (value 1) at the top of the cylinder (as shown by the "lightness" arrow in FIG. 8A).

In both geometries, the additive primary and secondary colors (red, yellow, green, cyan, blue and magenta) and linear mixtures between adjacent pairs of them (sometimes called pure colors) are arranged around the outside edge of the cylinder with saturation 1 (saturation 804 is represented by the "saturation" arrow in FIG. 8A). These saturated colors have lightness 805 of 50% in HSL, while in HSV they have a lightness 805 value of 100%. Mixing these pure colors with black, producing so-called shades, leaves saturation 804 unchanged. In HSL, saturation 804 is also unchanged by tinting with white, and only mixtures with both black and white, called tones, have a saturation 804 of less than 100%. In HSV, tinting alone reduces saturation 804.

Figure 8B:
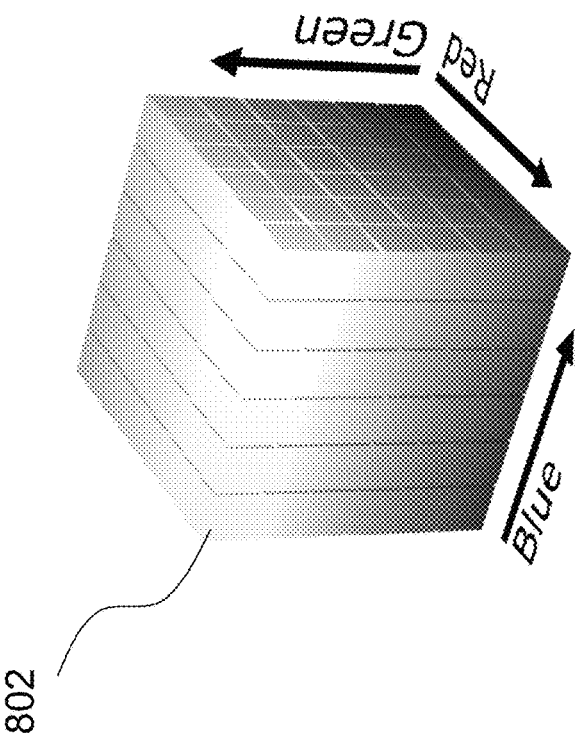
FIG. 8A and FIG. 8B are diagrams illustrating the conceptual and mathematical relationship between the HSL and red-green-blue (RGB) color formats, in accordance with some examples provided herein.
Figure 8A:
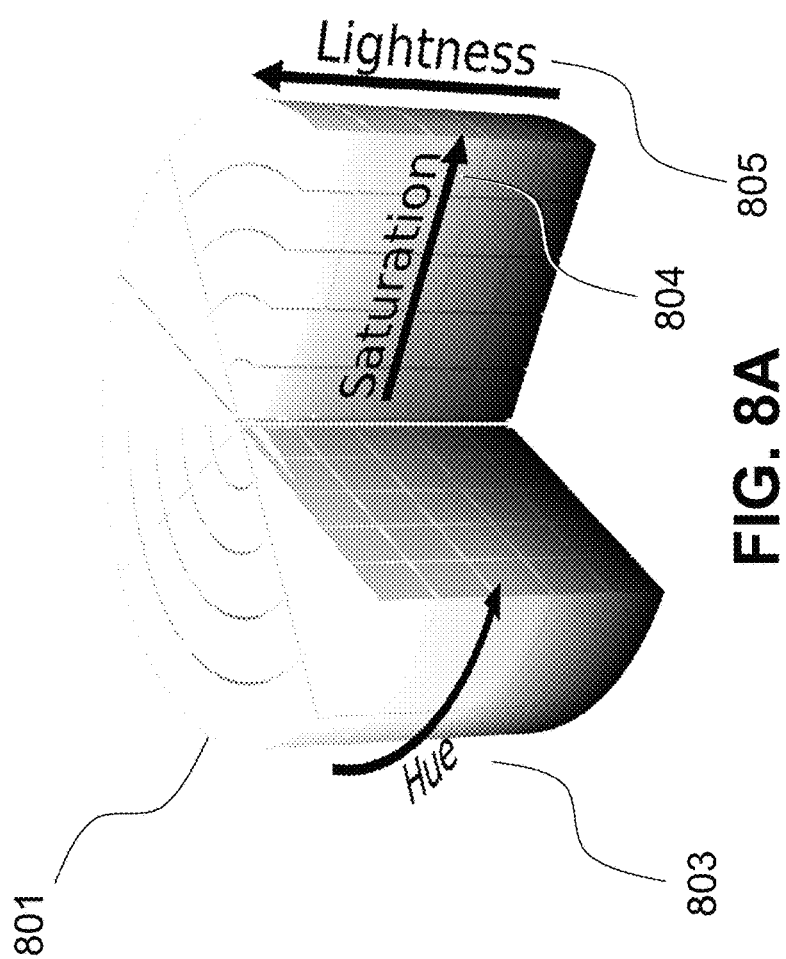

FIG. 8B is a diagram illustrating an example of a cubic representation 802 of the red-green-blue (RGB) color space. The mathematical relationship between the RGB and HSL color space is as follows:

$$L=R+G+B/3$$

$$S=1-(3/(R+G+B))*\min(R,G,B)$$

$$H=\cos^{-1}((0.5(R-G)+(R-B))/((((R-G)2)+((R-B)(G-B)))^{0.5}).$$

Figure 9:
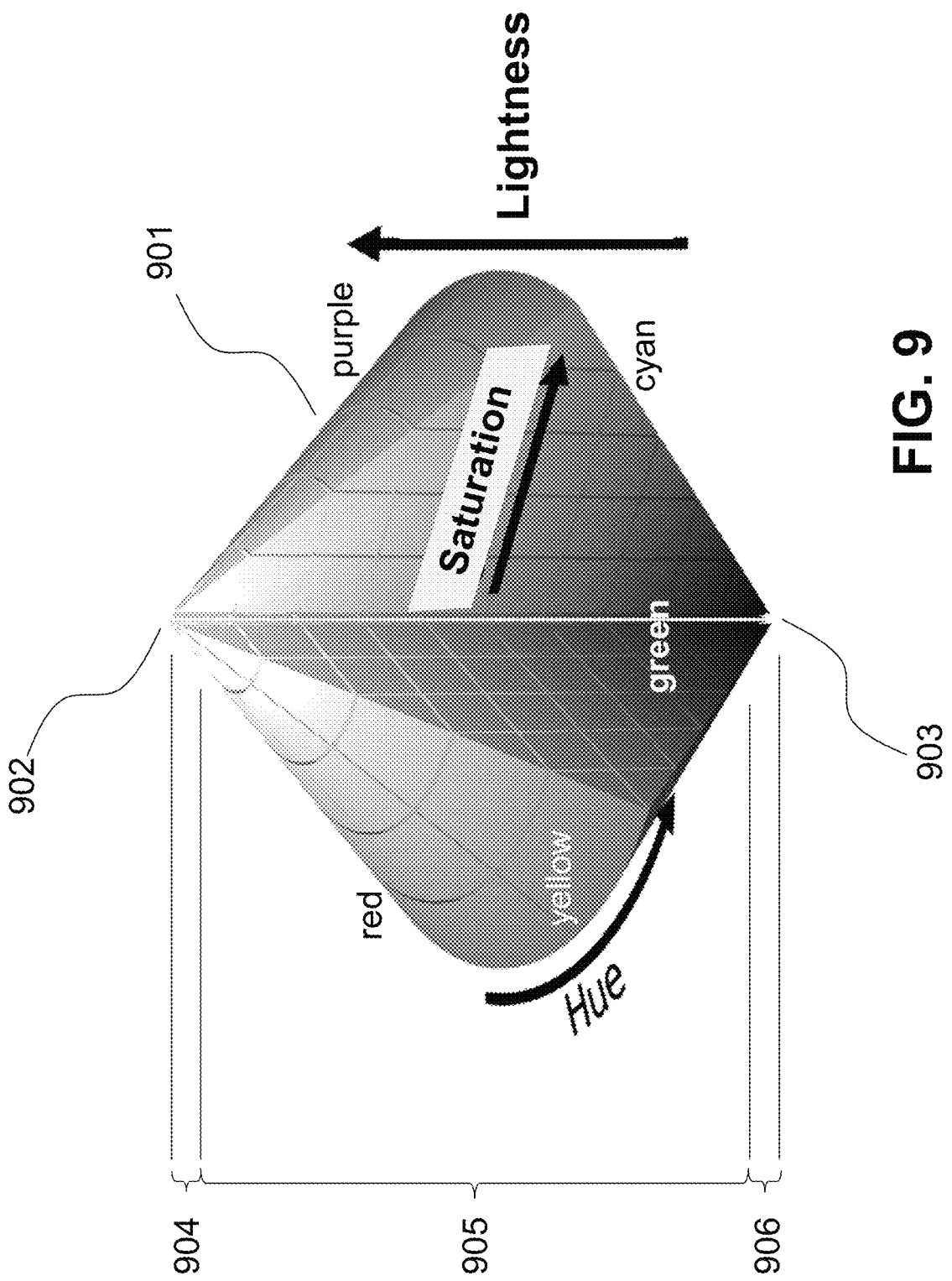
FIG. 9 is a diagram illustrating the color space representation of HSL in a bi-conic representation that reflects the available range of saturation relative to lightness, in accordance with some examples provided herein.

Because these definitions of saturation, in which very dark (in both models) or very light (in HSL) near-neutral colors are considered fully saturated, conflict with the intuitive notion of color purity, often a bi-conic representation 901 (also referred to as a cone) is used instead, as shown in FIG. 9. Saturation is used as the radial dimension of the bi-conic representation 901. Because the model with lightness in the vertical dimension takes the shape of a cone, HSL can be referred to as a "bi-cone model," as illustrated in FIG. 9.

Figure 6:
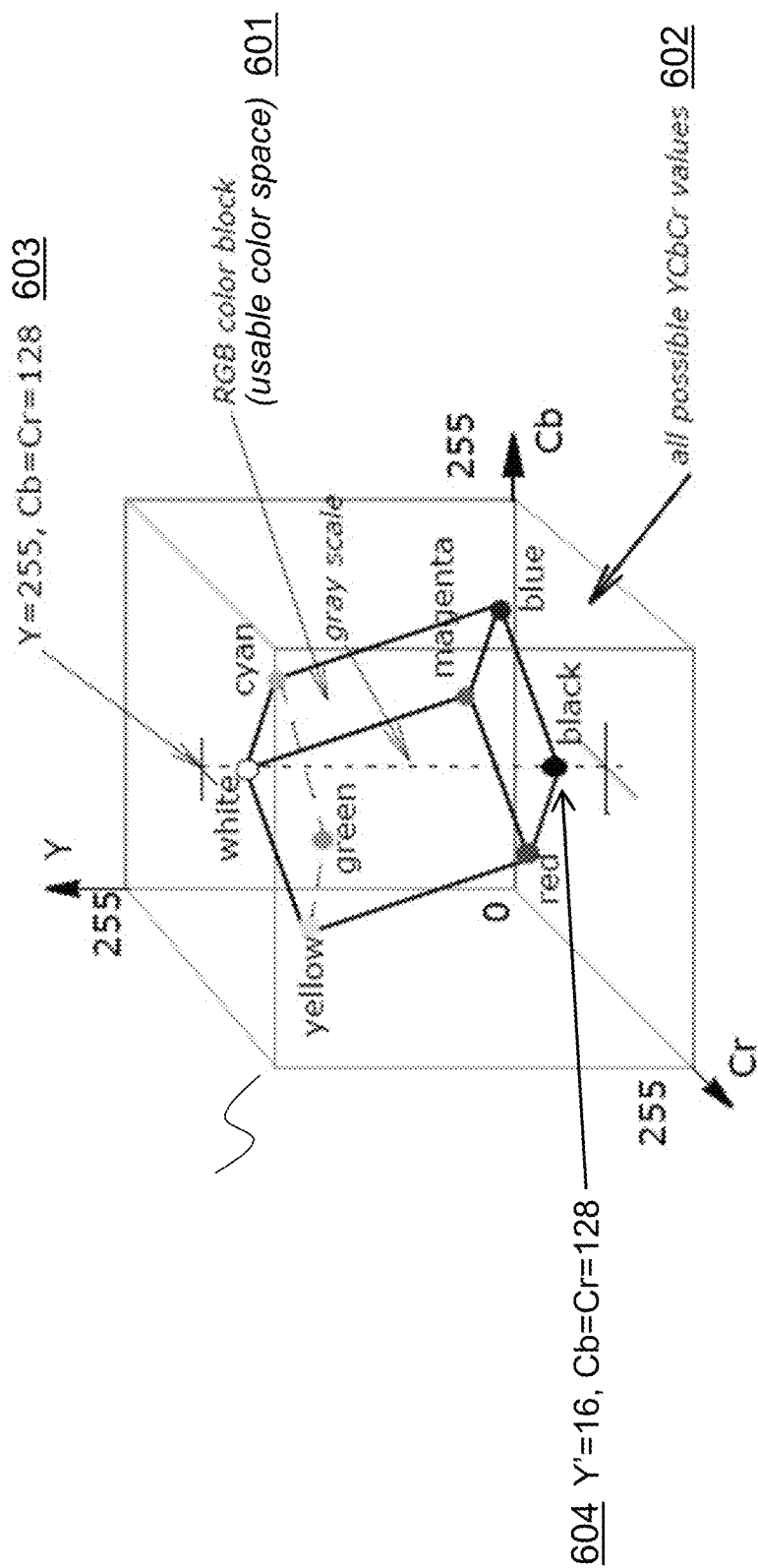
FIG. 6 is a diagram illustrating the luma-chroma (Y'CbCr) color format for images and/or video frames, in accordance with some examples provided herein.

Hue, Saturation, and Lightness (HSL) can be derived via geometric steps. The HSL model starts with an RGB cube (e.g., the RGB cube 802 in FIG. 8B) with constituent amounts of red, green, and blue light in a color denoted R, G, B. The RGB cube is tilted it on its corner (as shown in FIG. 6), so that black rests at the origin with white directly above it along the vertical axis. Then, the hues of the colors in the cube are measured by their angle around the axis (running through the black and white points), starting with red at 0°. The model then uses a characterization of value and lightness, and then defines saturation to range from 0% along the axis to 100% at the most colorful point for each pair of other parameters.

Luminance-chrominance systems as applied to video are now described. As noted above, the HSL and HSV color systems were developed in the 1970's to serve the emerging computer graphics industry and, as also described above, were developed from existing color space systems in use for photography and other industrial applications. Prior to that in the 1950's, the television industry developed a similar color model that was suited to a unique requirement of the analog technology of the day, which was the need to add color to an industry already operating in monochrome. Furthermore, the addition of a color signal needed to be backward compatible with the millions of television receivers already in operation in consumer households. The fundamental principle employed treated black and white information (called luminance) and color information (called chrominance or chroma) as separate carriers. Luminance was designated Y. Chrominance (designated C) was split into two components, one for hue (called I) and one for saturation (called Q). The I, for in-phase, and Q, for quadrature, were two signals modulating the color subcarrier which, for the U.S. NTSC standard, was a 3.579 MHz carrier embedded with the amplitude-modulated luminance carrier and frequency-modulated sound carrier.

Later, as television production adopted digital encoding means (prior to HDTV), variations developed such as YUV and YCbCr (which will be referenced from here forward), among others, and together are sometimes referred to as luminance/chrominance, or Y/C, systems. In principle, the variations all relate back the HSL color space but are created as "color-difference" components or values derived from blue minus luminance (U and Cb) and red minus luminance (V and Cr). All Y/C systems directly translate to RGB, which is the final output to the display device. For example, RGB can be converted to Y' Cb' Cr' as follows:

$$Y'=0.257*R'+0.504*G'+0.098*B'+16$$

$$Cb'=-0.148*R'-0.291*G'+0.439*B'+128$$

$$Cr'=0.439*R'-0.368*G'-0.071*B'+128$$

Y' Cb' Cr' can be converted to RGB as follows:

$$R'=1.164*(Y'-16)+1.596*(Cr'-128)$$

$$G'=1.164*(Y'-16)-0.813*(Cr'-128)-0.392*(Cb'-128)$$

$$B'=1.164*(Y'-16)+2.017*(Cb'-128)$$

There are advantages to systems that treat luminance separately from chrominance. One advantage is that Y/C systems were made to be compatible with previously existing monochrome analog television, and were developed for the compatible transition to color television in the 1950's as previously noted.

The Y' channel (where Y' is a gamma-corrected Y) contains the information recorded by monochrome cameras, producing a signal suitable for display on black and white systems. These black and white displays can ignore the C signal (the I-Q modulated color subcarrier) without harming the picture quality. On a color display, all signals are used, and the original RGB information is decoded.

Another advantage of Y/C systems is that some of the information can be discarded in order to reduce overall bandwidth requirements. One example of such a technique is called subsampling, which is described in more detail below. The human eye has less spatial sensitivity to color than luminance and so the accuracy of the brightness information of the luminance channel has far more impact on the image detail (as perceived by the viewer) than that of the color components. Understanding this human visual bias, industry standards, such as the now-obsolete NTSC, PAL, and SECAM standards, reduced the bandwidth of the chrominance channels considerably. The digital television standards of the world continue to process color information at a reduced bandwidth relative to luminance for the same reasons.

Therefore, the resulting U and V color signals of the Y'UV system, the principle components of the C signal, can be substantially compressed through chroma subsampling. For example, only half of the horizontal resolution compared to the brightness information can be kept (termed 4:2:2 chroma subsampling). Different chroma subsampling formats can be used, such as a full 4:4:4 chroma subsampling format, a 4:2:2 chroma subsampling format, and a 4:2:0 chroma subsampling format, where the vertical resolution is halved to give the 4:2:0 subsampling format. The 4:x:x representation primarily conveys the ratio of luminance to chrominance components and has been in use since the very earliest digital NTSC standard, which used a 4:1:1 chroma subsampling format. In the 4:1:1 chroma subsampling format, the horizontal color resolution is quartered (as shown by the empty dots), while the vertical color resolution is full resolution (as shown by the solid dots), in which case the picture carries only a quarter as much color resolution compared to brightness resolution. Video production systems may use uncompressed signals with 4:4:4 chroma subsampling format, providing identical resolution for both brightness and color information and is equivalent to the RGB values of raw video.

In place of Y'UV, the Y'CbCr color space is used as the standard format for digital video compression systems such as MPEG-2, H.264, and H.265. The Y'CbCr format is directly related to Y'UV, differing only in offset and scale. Digital broadcast television and digital versatile discs (DVDs) can preserve their compressed video streams in the MPEG-2 format, which uses a Y'CbCr color space while retaining the established process of chroma subsampling. The professional "CCIR 601" digital video format also uses Y'CbCr at the common chroma subsampling rate of 4:2:2, primarily for compatibility with previous analog video standards.

Y/C systems are not absolute color spaces. Rather, the Y/C representation is a way of encoding RGB information, and the actual colors that are displayed depend on the original RGB color space used to define the system. Therefore, values expressed as Y'UV or Y'CbCr are translated directly back to the values of the original set of primary colors of red, green, and blue. There are many color spaces in widespread use today including sRGB, adobeRGB, and ProPhotoRGB among many others. The television industry standardized on sRGB.

Furthermore, the range of colors and brightness (known as the color gamut) of RGB (whether BT.601 or Rec.709) is far smaller than the range of colors and brightnesses allowed by YUV. This can be very important when converting from Y'UV or Y'CbCr to RGB, since the formulas above can produce "invalid" RGB values, including values that are below 0% or above 100% of the range and thus outside the standard 16-235 luma range and 16-240 chroma range for TVs and HD content; or outside 0-255 for personal computer displays. Unless these values are scaled properly, they will usually be mathematically limited (e.g., clipped) to the valid range of the channel affected. This changes the hue of the color, which can be undesirable, so television production systems provide a function to remap colors typically using a perceptual schema to keep colors within the RGB gamut, and, while colors are shifted, the overall perception to the viewer remains consistent.

The International Telecommunications Union (ITU) Rec. 709 defines an RGB encoding and a Y'CbCr encoding which is sometimes known as YCbCr, each with either 8 bits or 10 bits per sample in each color channel. FIG. 6 is a diagram illustrating the Y'CbCr format (represented as block 602 for all possible YCbCr values) formed by balancing the RGB color space (represented as an RGB color block 601) on its black point 604, with the white point 603 directly above the black point. The formulas for translating between RGB and Y'CbCr are given above. In the 8-bit encoding, the R, G, B, and Y channels have a nominal range of [16 . . . 235], and the Cb and Cr channels have a nominal range of [16 . . . 240] with 128 as the neutral value. Therefore, in RGB, reference black is (16, 16, 16) and reference white is (235, 235, 235). In Y'CBCR, as shown in FIG. 6, reference black is (16, 128, 128), and reference white is (235, 128, 128). Values outside the nominal ranges are allowed, but typically they would be clamped for broadcast or for display. Values 0 and 255 can be reserved as timing references and may not contain color data. Rec. 709's 10-bit encoding uses nominal values four times those of the 8-bit encoding. Rec. 709's nominal ranges are the same as those defined in ITU Rec. 601.

As noted above, the video formats of Y'CbCr, Y'UV, or the older analog YI/Q all directly translate to R, G, and B values, as does the above example of HSL shown in FIG. 8A. Hence, one of ordinary skill will recognize that any discussion of color space is absolute between any two systems, allowing any one color space to be directly translated into the other color space without loss and by utilizing simple arithmetic. With this understanding, the techniques described herein will be described in terms of HSL which is translated to RGB and then translated to Y'CbCr for transmission through a network to receiving device (e.g., a television display, such as an HDTV). Any type of receiving system (e.g., a television receiver system of any type) can then translate Y'CbCr to RGB (or other color space if needed) for the ultimate display of the watermark encoded video frames of the application.

The techniques described herein can hide data in a video frame by taking advantage of the defined color spaces as well the understanding of human visual perceptual and its boundaries. The concept of representing color space in terms of hue, saturation, and lightness was first illustrated by Wilhelm Ostwald in 1916, a Nobel laureate in chemistry for his work on chemical equilibria, who was interested in systematizing the process of color value creation from the artist's perspective of mixing base colors with successive degrees of white (the top portion 902 of the bi-conic representation 901 shown in FIG. 9), and alternatively mixing base colors with successive degrees of black (the bottom portion 903 of the bi-conic representation 901), which is a subtractive process when applied to the chemistry of paints.

In 1963, the professor and artist, Josef Albers, published a seminal study entitled "Interaction of Color" from his work on human perception of color. His influential study explored the combination of colors examining contrasting interactions of color on human perception. Albers and many notable artists from the Bauhaus school fled Germany in the 1930's and came to the U.S. He first settled at Black Mountain College in North Carolina teaching fine arts while exploring color theory. In 1950 he accepted a professorship at Yale University. Notably, one aspect of his studies illustrated how a fixed color appeared to be very different depending on the colors surrounding it. His book and many other publications aptly illustrated this effect among others.

In 1987, the Tektronix company, a noted leader in test equipment, received U.S. Pat. No. 4,694,286. This patent taught the use of the bi-cone HSL model for color graphics terminals for which Tektronix became a pioneering leader along with technology for television broadcast.

The techniques described herein utilize this information with an understanding of color space representations (e.g., for television and other content) along with the understanding of human perception to color to manipulate the parameters of hue (H), saturation (S), and lightness (L) to hide digital data in plain sight throughout a video frame. For example, referring to the HSL cylinder 801 shown in FIG. 8A, it can be shown that for any hue 803 at a low or high lightness 805, the saturation 804 and be changed for a small area of the display screen without being noticeable to the human eye. For a low or high lightness 805 for some colors, hue 803 can be shifted with little discernibility. At near full lightness (white) or near minimum lightness (black), hue and saturation can be changed significantly without creating a visible artifact.

In some cases, there is a range of lightness 805 that does not lend itself to encoding changes in hue 803 and/or saturation 804. As noted above, FIG. 9 is a diagram illustrating a bi-conic representation 901 of the HSL color space. The modulation space used by the techniques described herein can include the color space shown in bi-conic representation 901. To obtain the bi-conic representation 901, the cylinder of HSL is modified to create two adjoined cones (hence, the bi-conic representation 901), with white at the top portion 902 of the top cone and black at the bottom portion 903 of the bottom cone. The very top of the bi-conic representation 901 (the top portion 902 representing white) can be a single data point where lightness is at a maximum value, saturation is at zero, and hue is indeterminant (when saturation is zero), in which case no change in saturation (S) or hue (H) would change the translate value in RGB which, in an 8-bit system, would be 255, 255, and 255, respectively. Similarly, when lightness is at a minimum (the bottom portion 903 representing black), saturation (S) would again be zero, rendering hue (H) indeterminant for an RGB value of 0, 0, 0. As defined above, the luminance signal (Y') is limited to the range of 16 to 235 out of 0 to 255, which is 86.3% of its total range. Similarly, the Cr and Cb color-difference components (or signals) are limited to 16 to 240 in a range of 255, which is 87.9% of the available range. In some implementations, for compatibility reasons, the range of HSL values used by the techniques described herein can be limited to the lightness range 905 of 86.3%, where the minimum 906 represents 6.3% above black and the maximum 904 represents 94.1% of full-scale of lightness (or 5.9% below peak white).

The watermarking techniques described herein can embed additional watermark data (referred to as additional data or binary data) within video frames in a way so that the additional data is not visible to a viewer of the video content. For example, the data can be embedded in a video frame by defining a plurality of target regions or areas throughout the video frame, and modifying one or more pixel characteristics of certain pixels within the target regions. FIG. 1 is a diagram illustrating a video frame 100 (e.g., stored in a video frame buffer) including various regions of pixels (also referred to herein as target regions or areas, pixel regions, or pixel patches), shown as pixel regions 1, 2, 3, 4, 5, 6, 7, through 128. While 128 regions of pixels are illustrated in FIG. 1, one of ordinary skill will appreciate that any suitable number of pixel regions can be included in a frame. Each of the pixel regions can have a defined size, such as 12 pixels (width)×10 pixels (height), as shown by the enlarged pixel region 104.

With reference to one example pixel region 102 containing 12 pixels×10 pixels, a subset of pixels (shown as gray pixels, including the gray pixel 103) makes up an encoded block of data (e.g., one bit of data). As described in more detail below, the pixels surrounding the subset of pixels are shown as white pixels (including white pixel 105), and are used as a reference area to determine color space values to shift the values of the pixels in the encoded block (the subset of pixels).

Figure 2:
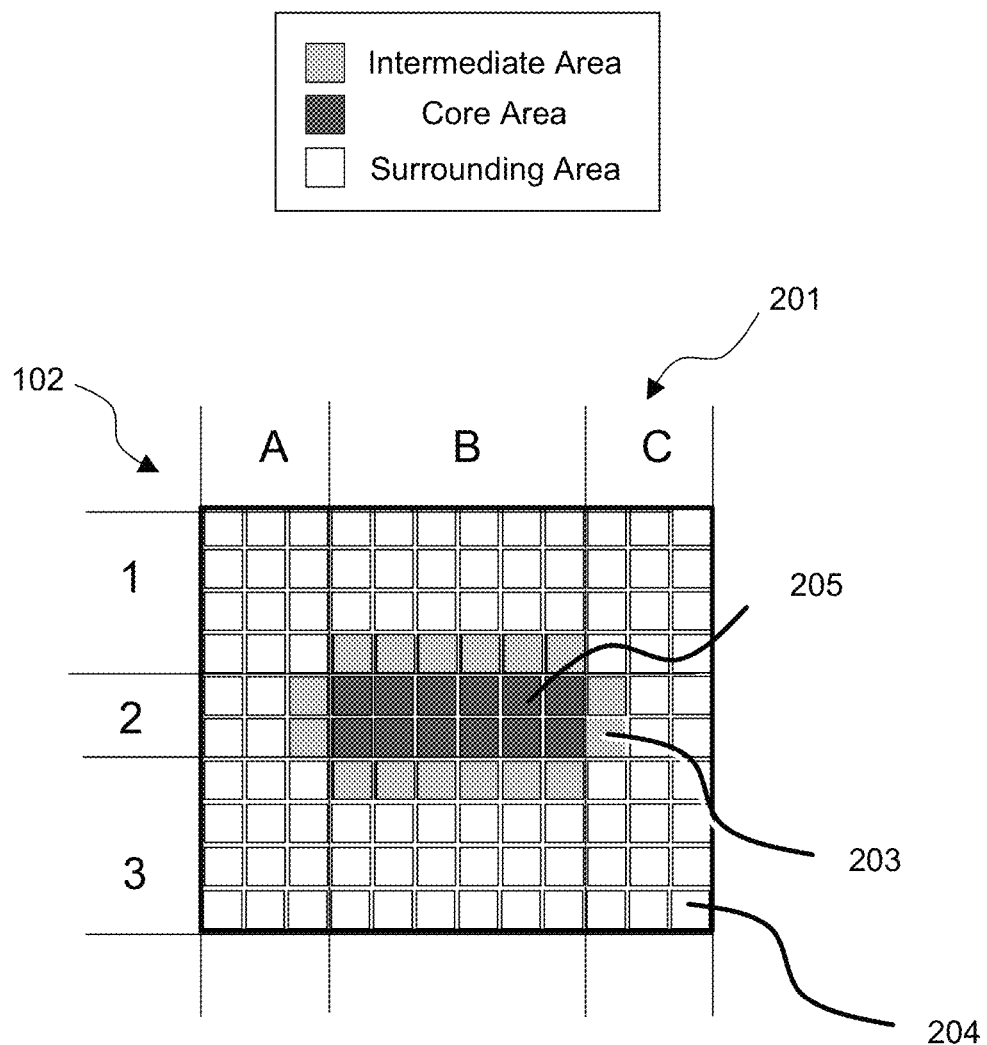
FIG. 2 is a diagram illustrating a pixel patch area where a core area is altered to represent a data element and is surrounded by an intermediate layer of partially altered pixels, which is further surrounded by a sample area used to determine the values of the intermediate and core layers, in accordance with some examples provided herein.

FIG. 2 is a diagram illustrating the pixel region 102 where a core area (shown as dark gray pixels in grid location B2, including dark gray pixel 205) of the subset of pixels is altered to represent encoded data. The core area is surrounded by an intermediate area (shown as light gray pixels, including light gray pixel 203, in the last row of B1, the last column of A2, the first column C2, and the first row of B3) of the subset of pixels that is also altered. The intermediate area is further surrounded by a reference area that includes the remaining pixels of the pixel region 102 (shown as white pixels, including white pixel 204) that are used to determine the values of the pixels in the intermediate and core areas.

To allow the additional digital data to be embedded into a video frame, and to allow a receiving device to easily decode the additional digital data, in some cases, a plurality of pixel regions (e.g., pixel region 102) are defined at specific locations in the video frame. This is illustrated in FIG. 1, where 128 pixel regions (as one illustrative example) are distributed throughout the video frame. At each pixel patch location, pixels included in the subset of pixels within the defined pixel region are altered to carry one or more binary bits of information (e.g., the core area in B2 shown in FIG. 2). In order to determine the change to the color information to encode one or more binary bits, the system can examine pixels within the surrounding area of the pixel patch that are surrounding the pixels that are to be altered. In some examples, the surrounding area can include any or all pixels other than B2.

In some examples, once the shift in the one or more pixel characteristics (e.g., the pixel-level color information, such as H, S, and/or L, as described in more detail below) is determined for the core area (e.g., the grid location B2) in FIG. 2, which is the data symbol, a secondary group of pixels in the intermediate area (including light gray pixel 203) can be modified to intermediate values. In one illustrative example, the intermediate values can include the difference between the average values of the pixels in the surrounding area (including white pixel 204) and the average values of the data carrying pixels in the core area (including dark gray pixel 205). These difference pixels can be applied in additional layers (columns and/or rows) around the intermediate area with yet more gradual pixel translation values applied to each surrounding layer (e.g., each successive row and/or column). An effect of using one or more intermediate layers is to remove sharp transitions of pixel values to which human vision is acutely sensitive, even though small numbers of pixels are involved.

In some cases, a stepped transition from the original pixel values to the data carrying pixel values allows for a possibly larger shift in the data carrying pixel values, allowing for more robust (e.g., error resistant) data carriage. Data robustness is especially important considering most video programming in systems, such as cable, satellite, or Internet television, is transcoded at least once, if not multiple times, and each transcoding degrades the video quality rendering embedded data more difficult to detect in the receiving system.

In some cases, the one or more pixel characteristics can include hue (H), saturation (S), and lightness (L). The H, S, and/or L shifts used to alter the data carrying pixels (e.g., the pixels in the core area, such as pixel 205, and/or the pixels in the intermediate area, such as pixel 203) can be determined to some degree algorithmically. For instance, the surrounding reference area (the white pixels) can be sampled to determine the H, S, and/or L (or other pixel characteristic) of the surrounding pixels. Based on the determined H, S, and/or L values (or other pixel characteristic), the pixels in the core area and the pixels in the intermediate area can be can modulated or altered based.

In one illustrative example, if the average lightness (L) of the pixels in the surrounding reference area is less than 20% of full scale (e.g., less than 20% of a pixel with a dark color having, for instance, a pixel value of 0), then values of hue (H) of the pixels in the core area and/or intermediate area can be changed by, for instance, 25% and saturation (S) of the pixels can be reduced by, for instance, 50%, creating an encoded pixel area (including the core area with pixel 205 and intermediate area with pixel 203) that is detectably different from the surrounding reference area but not visible to the human eye. In another illustrative example, at the other extreme, when average lightness (L) of the pixels in the surrounding reference area is above, for example, 85%, and if saturation (S) of the pixels in the core area and/or intermediate area is greater than 50%, the saturation (S) of the pixels in the core area and/or intermediate area can be reduced to 15%. If the saturation (S) of the pixels in core area and/or intermediate area is below 50%, the saturation (S) can be increased to 85%. Changing the saturation (S) to 15% or 85% can create an encoded pixel area (including the core area with pixel 205 and intermediate area with pixel 203) that is detectably different from the surrounding pixel reference area but not visible to the human eye. In this example, only saturation is modified as the eye is more sensitive to color shifts in light fields.

As human visual perception is not an entirely linear process, all means of hiding data in a visual field cannot be determined strictly algorithmically. For example, animal vision is acutely sensitive to red, and in some examples, hues around red can be flagged so that they are avoided so that data is not embedded in these regions.

In some examples, a pixel-value look-up table (LUT) might be used where HSL values are used to look up in a key/value table a recommended substitute value of HSL for the data carrying pixels (in the core area and/or in the intermediate area). An HSL LUT can be constructed using two-percent steps of the full range (e.g., 50 steps) of each component of HSL, forming a three-dimensional sparse matrix of 125,000 entries (50×50×50). This LUT matrix needs only to be determined once. In some cases, approximately 10,000 entries would be sufficient for virtually any visual content. An illustrative example of the use the LUT might is as follows:

(1) calculate the average H, S, and L values of the pixels in the surrounding area (the white pixels in FIG. 2, including pixel 204);

(2) scale the HSL values to a one of fifty value as a percentage of the range of each HSL parameter, resulting in a three-byte value including one byte for H, one byte for for S, and one byte for L; for example, an indexed look-up table of H,S,L values preset to optimal numbers can be provided, where in this example there can be 50 entries in the table to select from based on the measured pixel characteristics of the surrounding pixel values;

(3) use the three-byte value to address the three-dimensional LUT matrix (to look up the correct table entry in the LUT);

(4) read the value for each HSL parameter from the table entry to be applied to the subset of pixels in the pixel region 102 (e.g., to all pixels in the subset of pixels, as shown in FIG. 1, or to the core area and the intermediate area, as shown in FIG. 2) in percent of full-scale of each respective H, S, and L parameter (e.g., the entry in the LUT can indicate a percentage relative to the maximum value of the range, as in the example provided below); in cases when a core area and an intermediate area are present, there can be 6 values in the LUT entry (3 values for HSL of the core area and 3 values for HSL of the intermediate area); and (5) convert the relative values of HSL to absolute values and apply to 203.

Using the example above and using two-percent steps across the range of available values (e.g., 50 steps), if the average HSL values of the surrounding area (by averaging the HSL values of all pixels in the surrounding area) are L=20; H=50; S=46, the LUT would return L=20 (no change in lightness); H=76 (change hue to 76% of its range); S=24 (reduce saturation to 24% of its range). For example, the HSL values are each one byte and have a range of 0 to 255. The steps are a percentage of the available range. In some cases, the values may not reach below 15 nor above 240, but regardless the steps are a percentage of the available range. The HSL values can then be translated to the respective RGB values written to a display buffer, which would be values that are in the safe operating range of the Y'CbCr limitations stated above, or to values consistent with any other color space as defined by the system utilizing the techniques described herein.

Figure 3A:
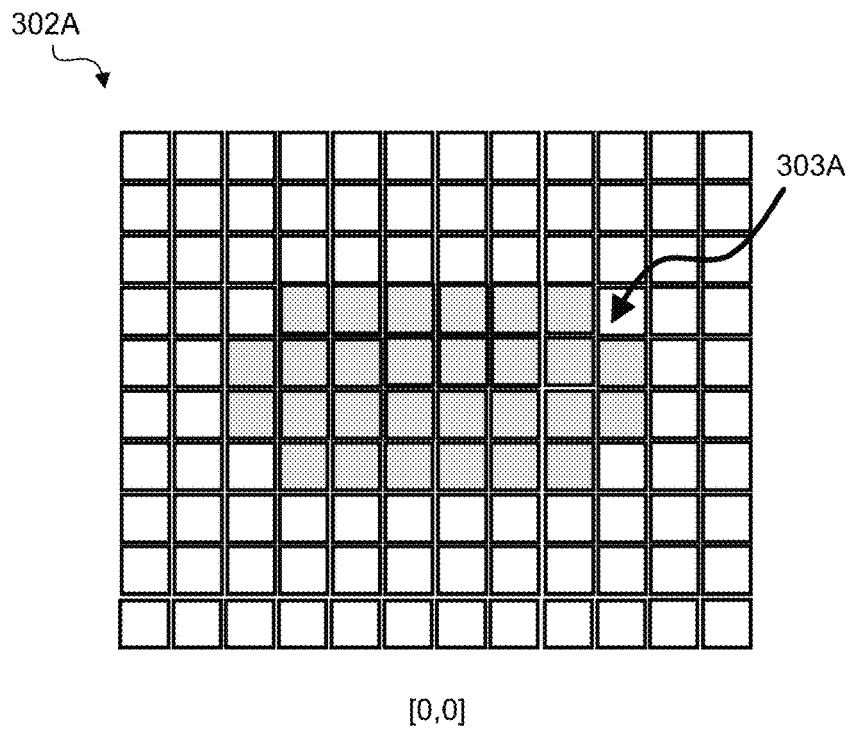
FIG. 3A-FIG. 3D are diagrams illustrating a four-level encoding scheme, in accordance with some examples provided herein.
Figure 3B:
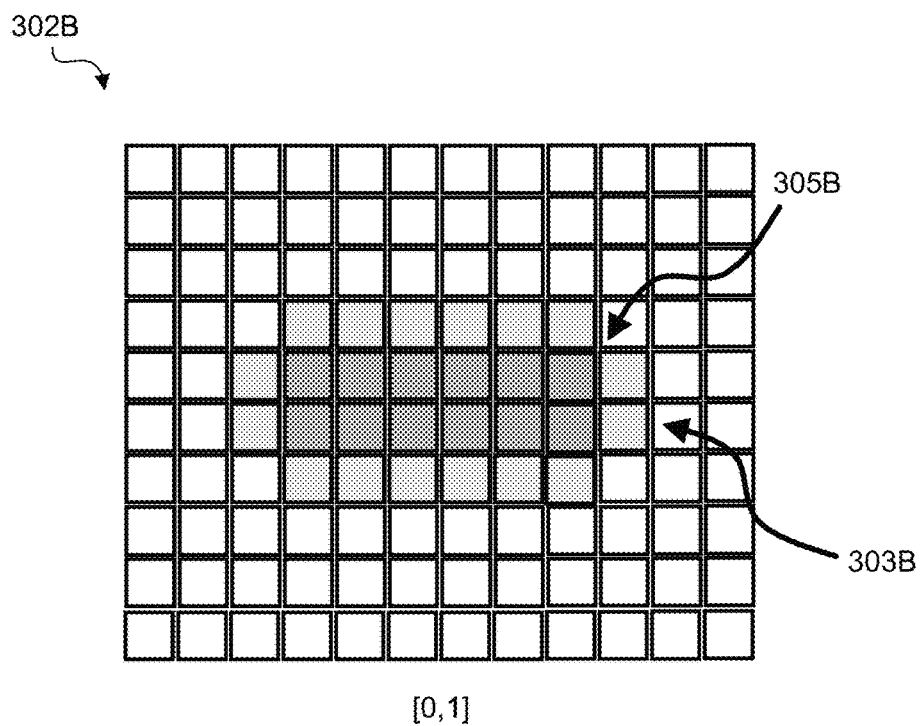
Figure 3C:
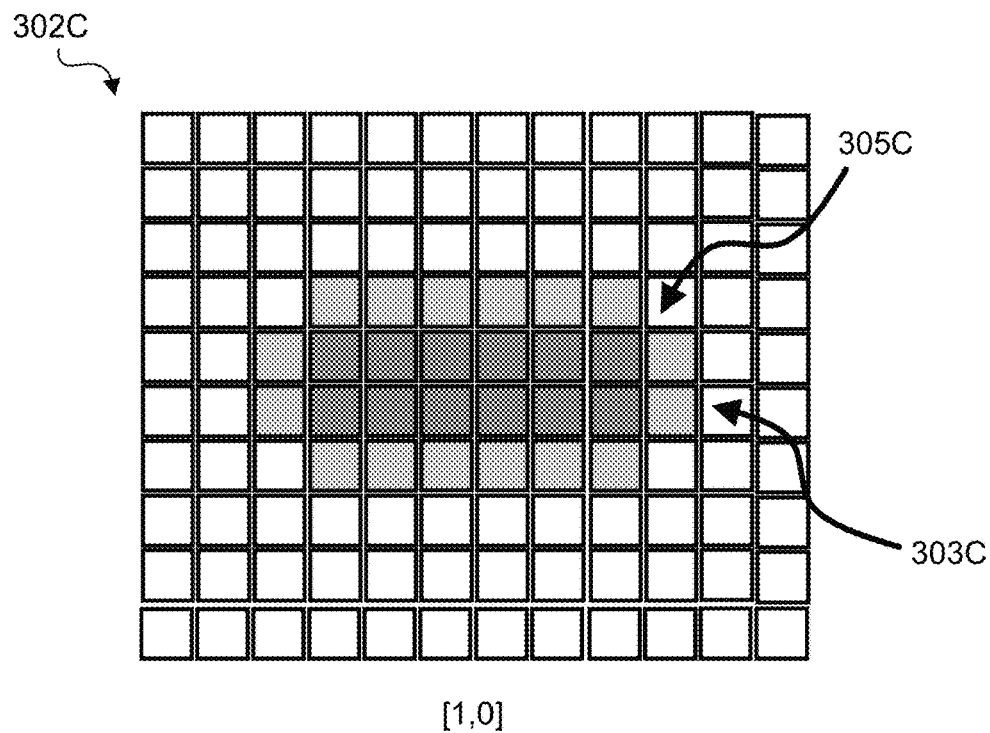
Figure 3D:
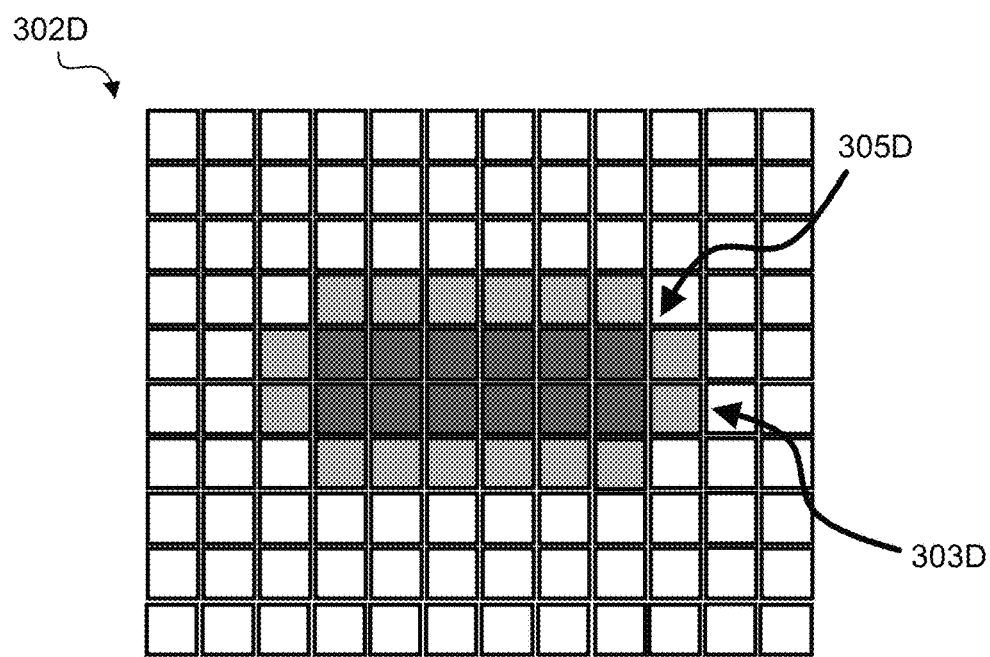

FIG. 3A-FIG. 3D are diagrams illustrating a four-level encoding scheme. In FIG. 3A, all pixels of a subset of pixels 303 (shown in a light gray color) in a pixel region 302A are modified to have the same pixel characteristics (e.g., HSL values), thus encoding a value of [0,0] into the pixel region 203. In FIG. 3B, a core region 305B of pixels (shown in a dark gray color) of a subset of pixels in a pixel region 302B are modified to a first set of modified pixel characteristics (e.g., having a first set of HSL values), and an intermediate region 303B of pixels (shown in a light gray color) of the subset of pixels in the pixel region 302B are modified to a second set of modified pixel characteristics (e.g., having a second set of HSL values), thus encoding a value of [0,1] into the pixel region 302B. In FIG. 3C, a core region 305C of pixels (shown in a dark gray color) of a subset of pixels in a pixel region 302C are modified to a third set of modified pixel characteristics (e.g., having a third set of HSL values), and an intermediate region 303C of pixels (shown in a light gray color) of the subset of pixels in the pixel region 302C are modified to a fourth set of modified pixel characteristics (e.g., having a fourth set of HSL values), thus encoding a value of [1,0] into the pixel region 302C. In FIG. 3D, a core region 305D of pixels (shown in a dark gray color) of a subset of pixels in a pixel region 302D are modified to a fifth set of modified pixel characteristics (e.g., having a fifth set of HSL values), and an intermediate region 303D of pixels (shown in a light gray color) of the subset of pixels in the pixel region 302D are modified to a sixth set of modified pixel characteristics (e.g., having a sixth set of HSL values), thus encoding a value of [1,1] into the pixel region 302D.

Figure 13:
FIG. 13 is an example of an image with multiple examples of data element locations, in accordance with some examples provided herein.
Figure 14:
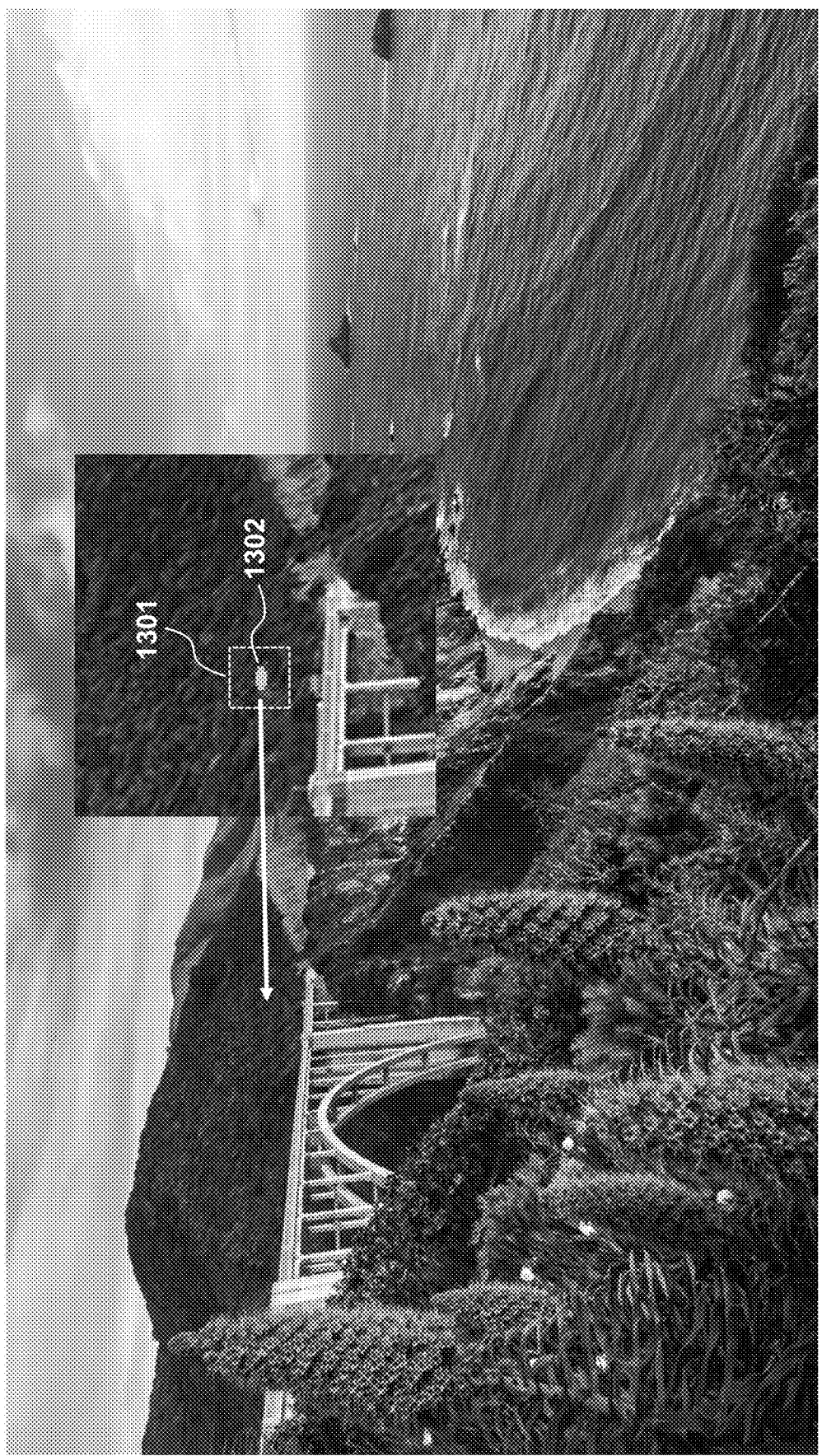
FIG. 14 is an example of a data element of the image from FIG. 13, in accordance with some examples provided herein.

FIG. 4A-FIG. 4F are diagrams illustrating an example of a data carrying block 410 being moved in a pseudo-random manner in a pixel region from frame to frame to obscure the presence of the grid to a viewer. In FIG. 4A-FIG. 4F, only one pixel region of the frames 401-406 is shown, and refers to the same pixel region across the frames 401-406. One of ordinary skill will appreciate that the frames 401-406 can include other pixel regions that are not shown (e.g., as shown in FIG. 1, FIG. 13, and FIG. 14).

Figure 4A:
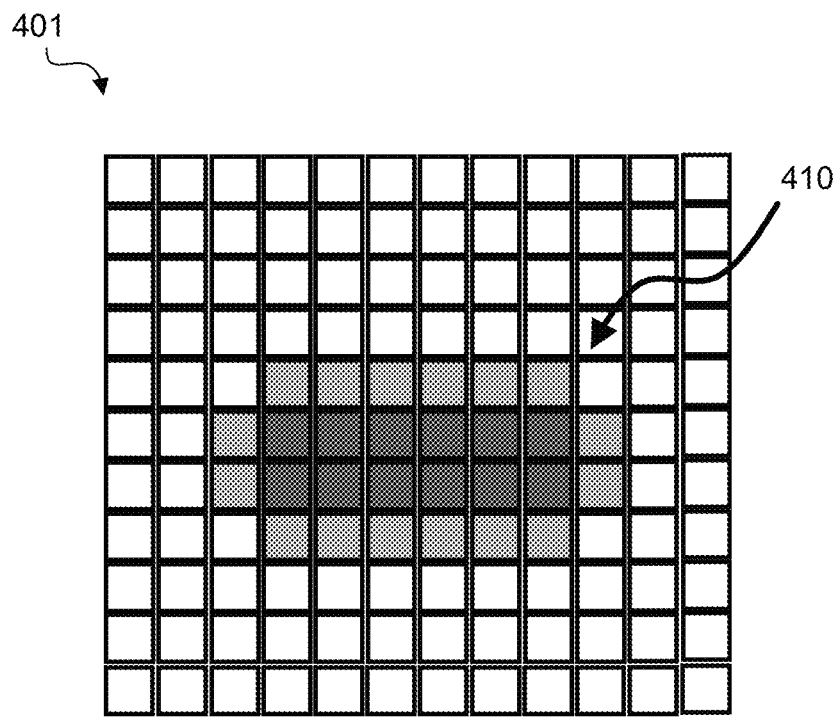
FIG. 4A-FIG. 4F are diagrams illustrating an example of the data carrying grid from FIG. 2 moving in a pseudo-random manner from frame to frame to obscure the presence of the grid to a viewer, in accordance with some examples provided herein.
Figure 4B:
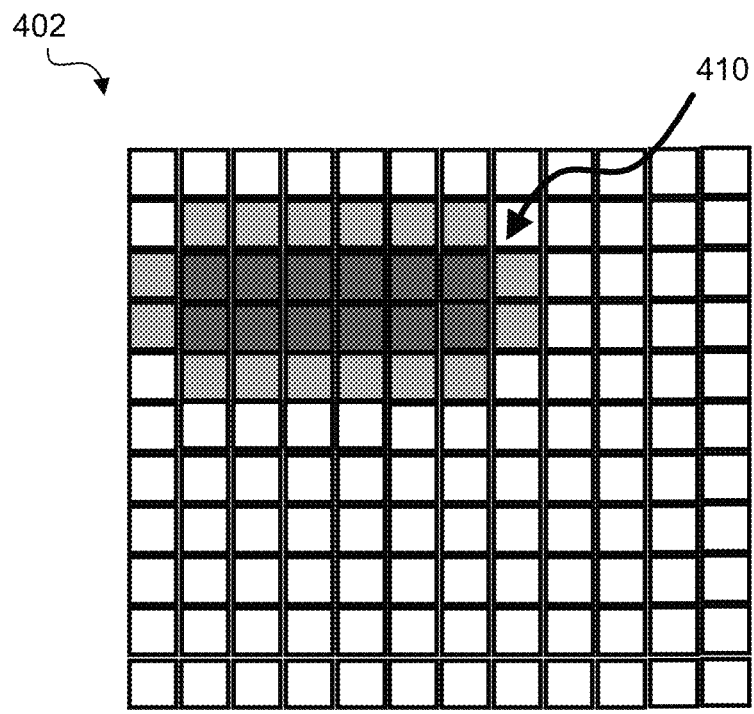
Figure 4C:
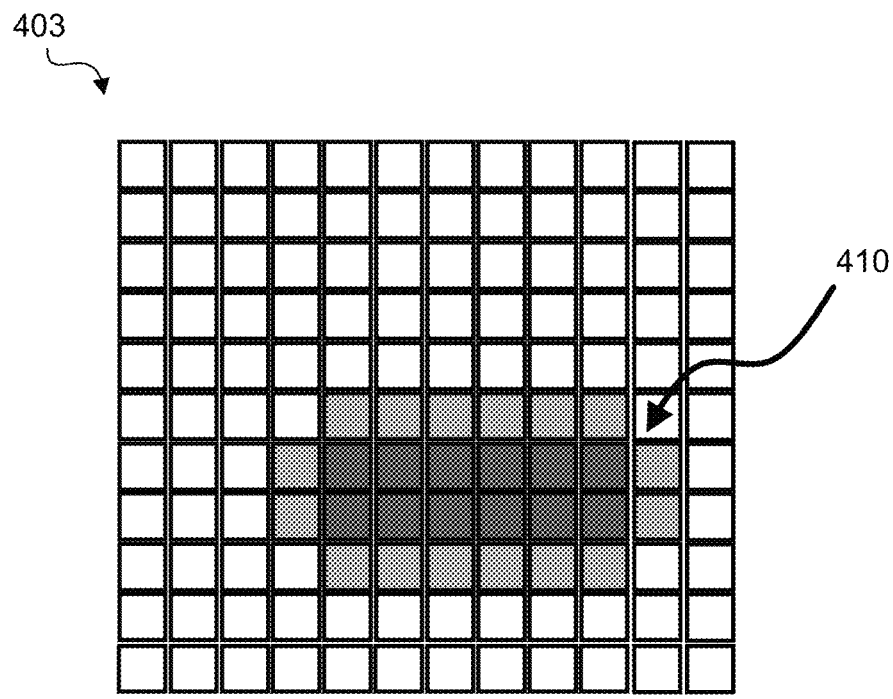
Figure 4D:
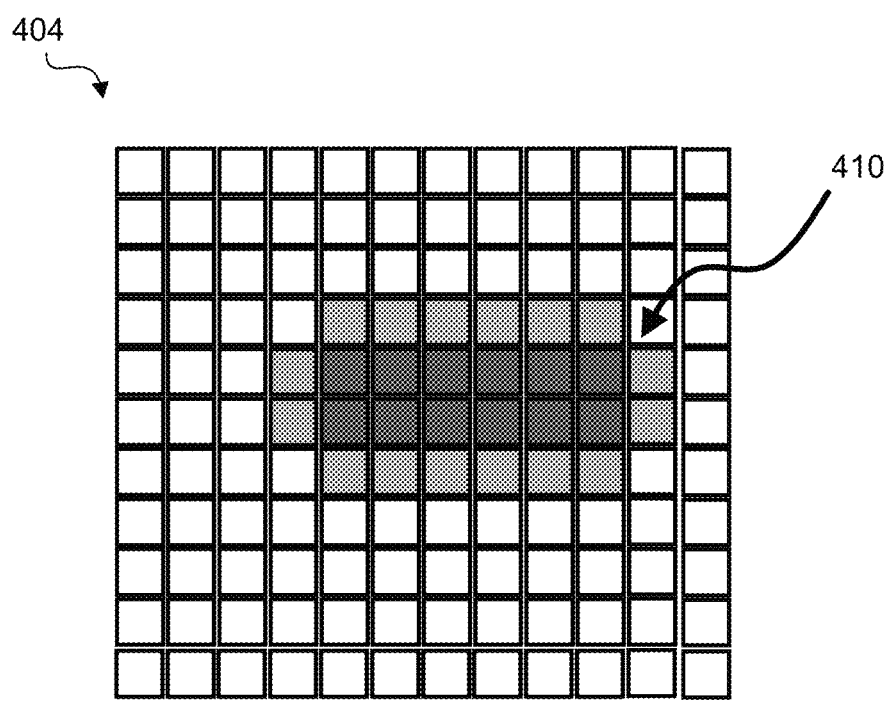
Figure 4E:
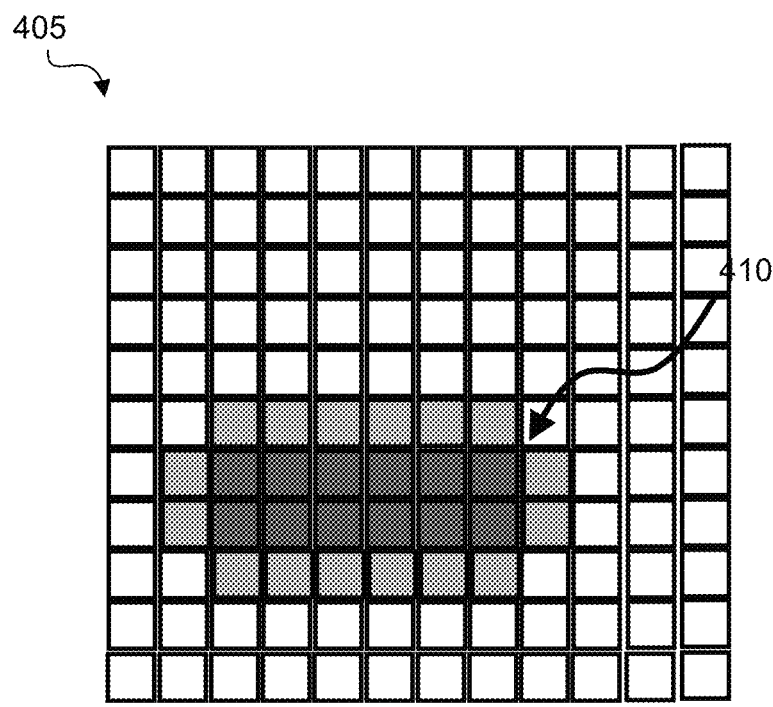
Figure 4F:
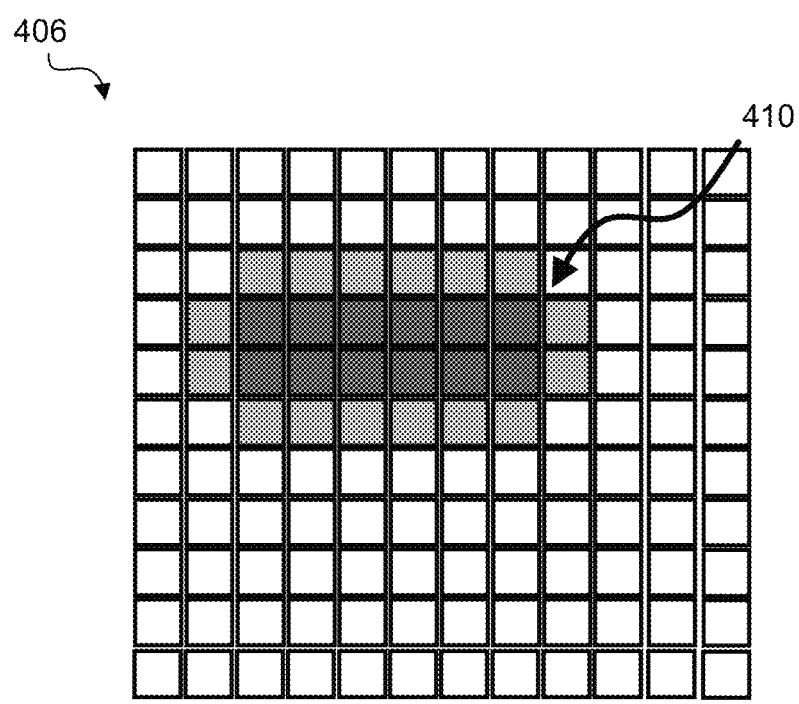

As shown in FIG. 4A, a data carrying block 410 is in a first location in the pixel region of a first frame 401, and is relocated to a second location in the pixel region of a second frame 402 shown in FIG. 4B. The data carrying block 410 is relocated to a third location in the pixel region of a third frame 403 shown in FIG. 4C, to a fourth location in the pixel region of a fourth frame 404 shown in FIG. 4D, to a fifth location in the pixel region of a fifth frame 405 shown in FIG. 4E, and to a sixth location in the pixel region of a sixth frame 406 shown in FIG. 4F.

Figures 5I, 5J, 5K, 5L:
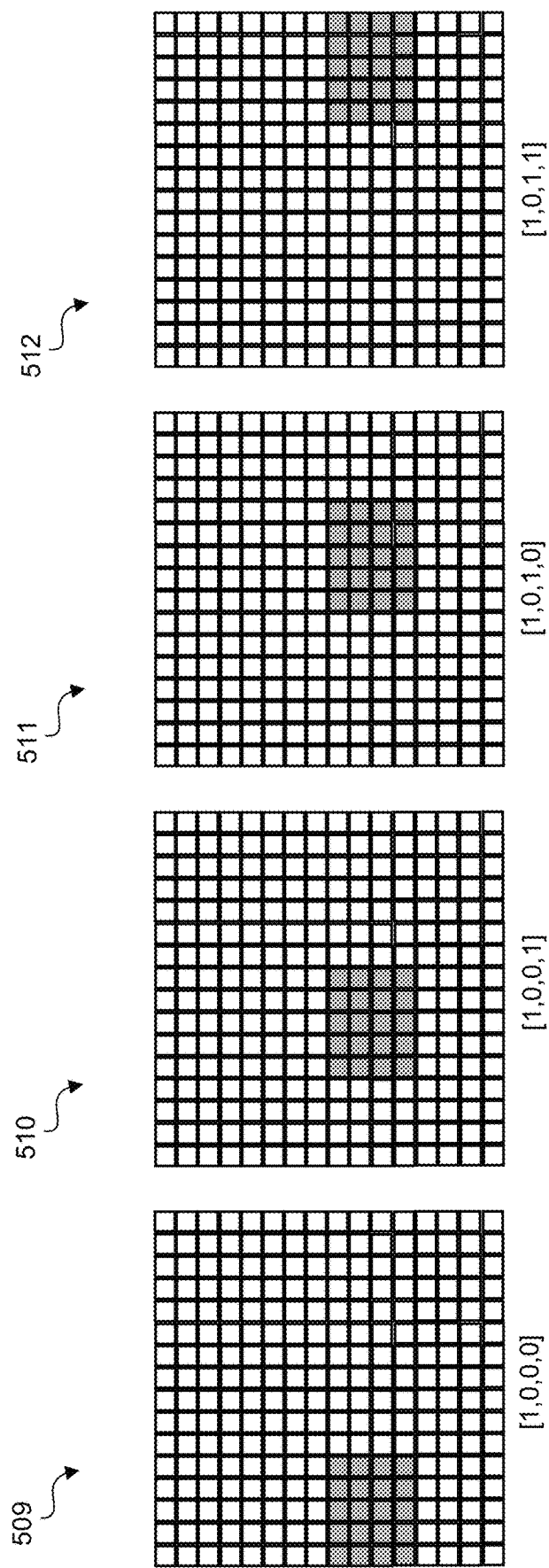
FIG. 5A-FIG. 5P are diagrams illustrating an example of moving the data encoding pixels to a multiplicity of locations within the pixel patch area in order to encode multiple bits per pixel patch, in accordance with some examples provided herein.

FIG. 5A-FIG. 5P are diagrams illustrating an example of a data carrying block 510 being moved to a multiplicity of locations within the pixel patch area in order to encode multiple bits per pixel patch. As shown, the data encoded pixels of the data carrying block 510 are moved to, in this example, one of 16 positions within the pixel patch area, thus encoding four bits of information. For example, the position of the data carrying block 510 in FIG. 5A encodes a four bit value of [0,0,0,0]. The position of the data carrying block 510 in FIG. 5B encodes a four bit value of [0,0,0,1]. The position of the data carrying block 510 in FIG. 5C encodes a four bit value of [0,0,1,0]. The position of the data carrying block 510 in FIG. 5D encodes a four bit value of [0,0,1,1]. The position of the data carrying block 510 in FIG. 5E encodes a four bit value of [0,1,0,0]. The position of the data carrying block 510 in FIG. 5F encodes a four bit value of [0,1,0,1]. The position of the data carrying block 510 in FIG. 5G encodes a four bit value of [0,1,1,0]. The position of the data carrying block 510 in FIG. 5H encodes a four bit value of [0,1,1,1]. The position of the data carrying block 510 in FIG. 5I encodes a four bit value of [1,0,0,0]. The position of the data carrying block 510 in FIG. 5J encodes a four bit value of [1,0,0,1]. The position of the data carrying block 510 in FIG. 5K encodes a four bit value of [1,0,1,0]. The position of the data carrying block 510 in FIG. 5L encodes a four bit value of [1,0,1,1]. The position of the data carrying block 510 in FIG. 5M encodes a four bit value of [1,1,0,0]. The position of the data carrying block 510 in FIG. 5N encodes a four bit value of [1,1,0,1]. The position of the data carrying block 510 in FIG. 5O encodes a four bit value of [1,1,1,0]. The position of the data carrying block 510 in FIG. 5P encodes a four bit value of [1,1,1,1].

In some cases, four-level coding can be employed in addition to positioning the pixel data, in which case a total of 6 bits can be encoded at each location. In the case of a data carrying block location determined by the watermark data, the position of the data carrying block will move around the pixel patch area in what would appear to be a random order to human visual perception, in which case an imposed pseudo-random sequence would be unnecessary and the pseudo-random encode area shift can be disabled.

Figure 10:
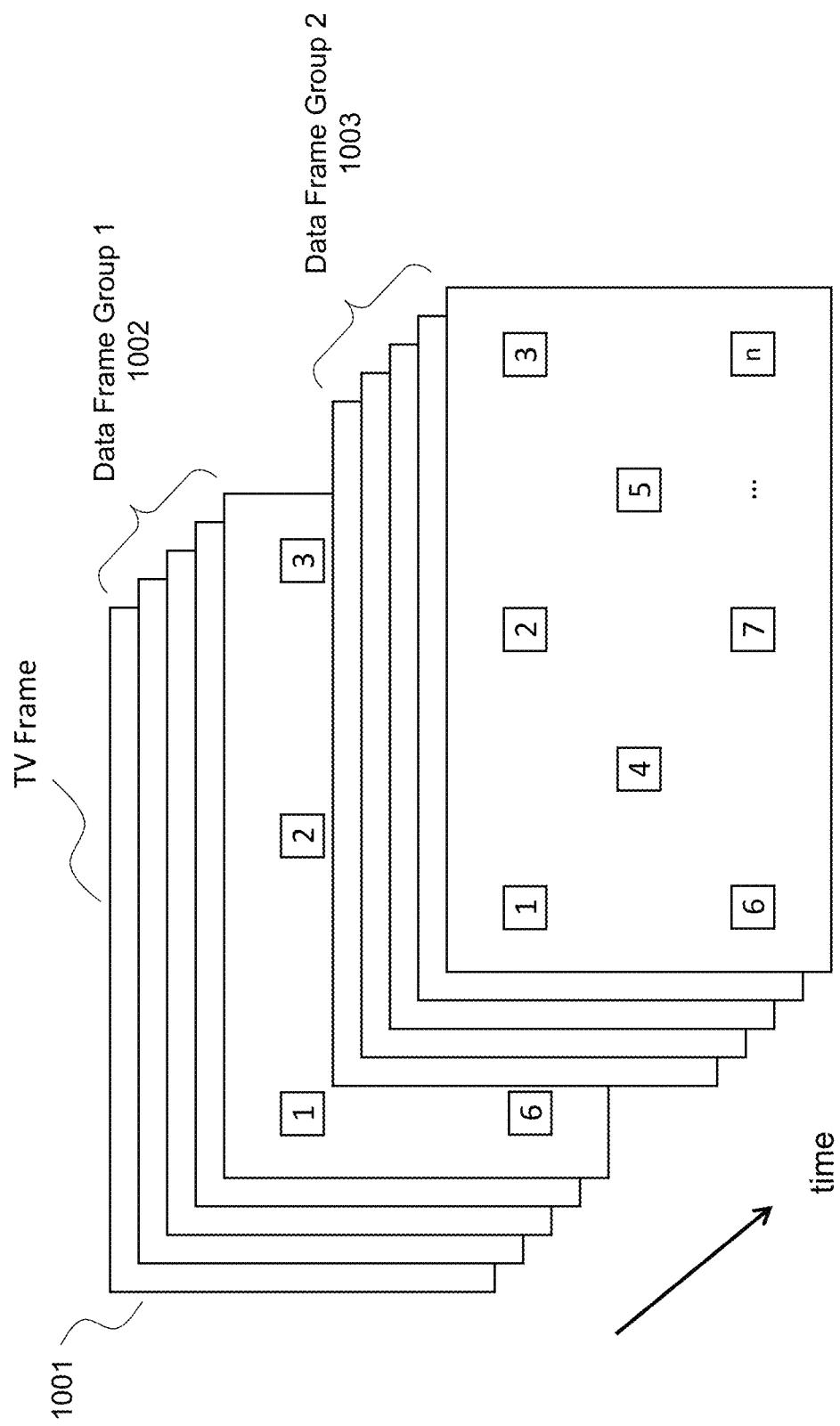
FIG. 10 is a diagram illustrating embedding of data in a plurality of video frames, in accordance with some examples provided herein.

In some examples, frames of video can be encoded in groups and carry a complex data message across multiple video frames. FIG. 10 is a diagram illustrating an embedding of additional watermark data in a plurality of video frames (e.g., television frames), with the data representing complex messages distributed across the plurality of video frames. For example, a first group (group 1) of frames 1002 is shown with the last frame in the first group containing a plurality of regions with additional watermark data. A second group (group 2) of frames 1003 is shown with the last frame in the second group containing a plurality of regions with additional watermark data. To decode multiple video frame watermarks into a composite message, any suitable data framing scheme or protocol can be employed. Where the multi-frame messaging is utilized, it would have its own error detection or correction encoding of the data contained in the composite message. Any suitable method of error detection or correction for this purpose can be used.

Figure 11:
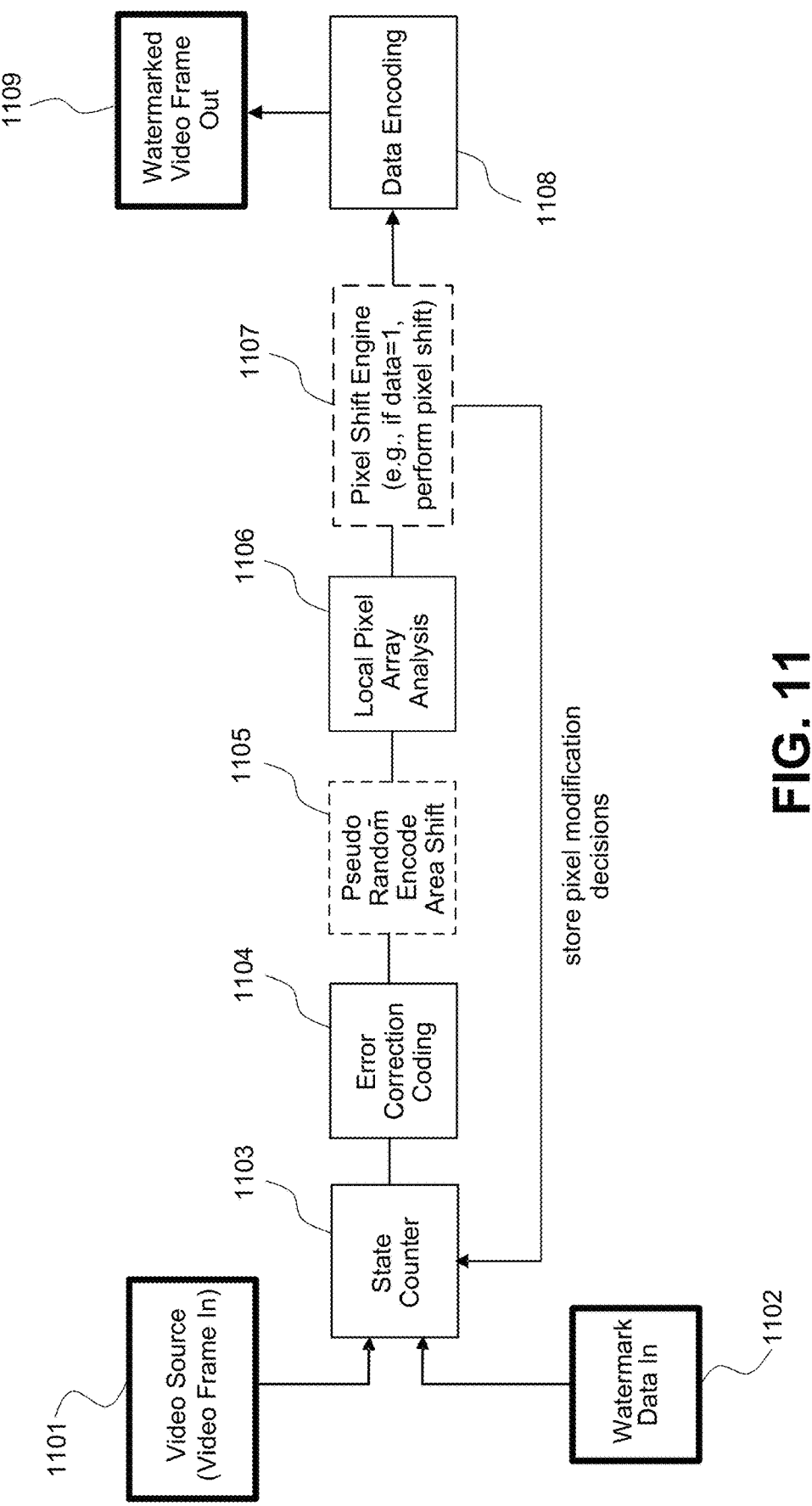
FIG. 11 is an encoding flow diagram illustrating the process of applying a watermark to a video frame, in accordance with some examples provided herein.

FIG. 11 is a diagram illustrating an example of a watermark encoding system. The system receives or obtains video frames from a video source 1101 (e.g., a video headend, a storage device, a cloud server system, a streaming video service provider, or other source of encoded video). The encoding system can then receive or obtain watermark data 1102 for a frame. In some cases, a state counter 1103 is initiated to track pseudo-random sequence placement of certain encoded pixels. For example, the state counter 1103 can store pixel modification decisions from the pixel shift engine 1107 (and in some cases from the local pixel array analysis engine 1106 and/or the pseudo random encode area shift engine 1105). In some cases, an error correction coding engine 1104 can apply error correction coding to the watermark data.

An optional (as indicated by the dashed lines) pseudo-random encode area shift engine 1105 can determine a position or location of a pixel region (e.g., one of the positions shown in FIG. 4A-FIG. 4F). If a pseudo-random offset scheme is employed, a pixel offset is determined for the data carrying block including the data carrying pixels. When a pseudo-random offset is employed, a pseudo-random motion of the data carrying block is created to help hide the data in the picture by moving the data area in a pseudo-random manner within the pixel region (e.g., as shown in FIG. 4A-FIG. 4F). This random motion creates slight visual "noise" to prevent fixed patterns of pixels from emerging from the embedded data's presence.

For a first pixel region of the video frame, a local pixel array analysis engine 1106 can analyze the pixels in a pixel region to determine a subset of pixels in the first pixel region to determine the pixel characteristics (e.g., H, S, and/or L values) of the surrounding pixels. The local pixel array analysis engine 1106 can analyze the surrounding pixels for each pixel region of the video frame. Once the subset of pixels (the data carrying block) in a pixel region is determined and the surrounding pixel area around the subset of pixels is examined to determine the pixel characteristics of the surrounding pixels, pixel shift engine 1107 can determine the shift in the pixel data that will be used to encode the data value, either algorithmically or via a LUT or a combination of both, as described above. If two-level encoding is to be applied, a single step is applied to shift the pixels in the subset of pixels to represent the data. If the target pixel is to encode four-levels, each two-bits of data is used to set four levels of pixel shift to encode the data, as shown in FIG. 3A-FIG. 3D.

In some examples, as shown in FIG. 2, the core area (including pixel 205) can be surrounded by an intermediate area including intermediate, or translational, pixels (including pixel 203) that represent intermediate HSL changes from the surrounding pixel area to the core area including the data carrying pixels (of the data carrying block). The intermediate area can be one, two, three, or more pixels wide and can be implemented as bands of transition from the surrounding area of pixels to the data carrying pixels, providing a blurring of the sharp edges between pixels. An advantage of including an intermediate area is to further render the data carrying pixels less visible or to apply more extreme shifts in H, S, and/or L values of a data carrying pixel as compared to the surrounding pixels, while still maintaining undetectability to a viewer due to the buffering effect of the one or more intermediate areas.

A data encoding engine 1108 can prepare (e.g., encode) the video data for transport. At 1109, the watermarked video is output. For example, the video including the additional watermark data can be transmitted for consumption or for further transmission.

Figure 12:
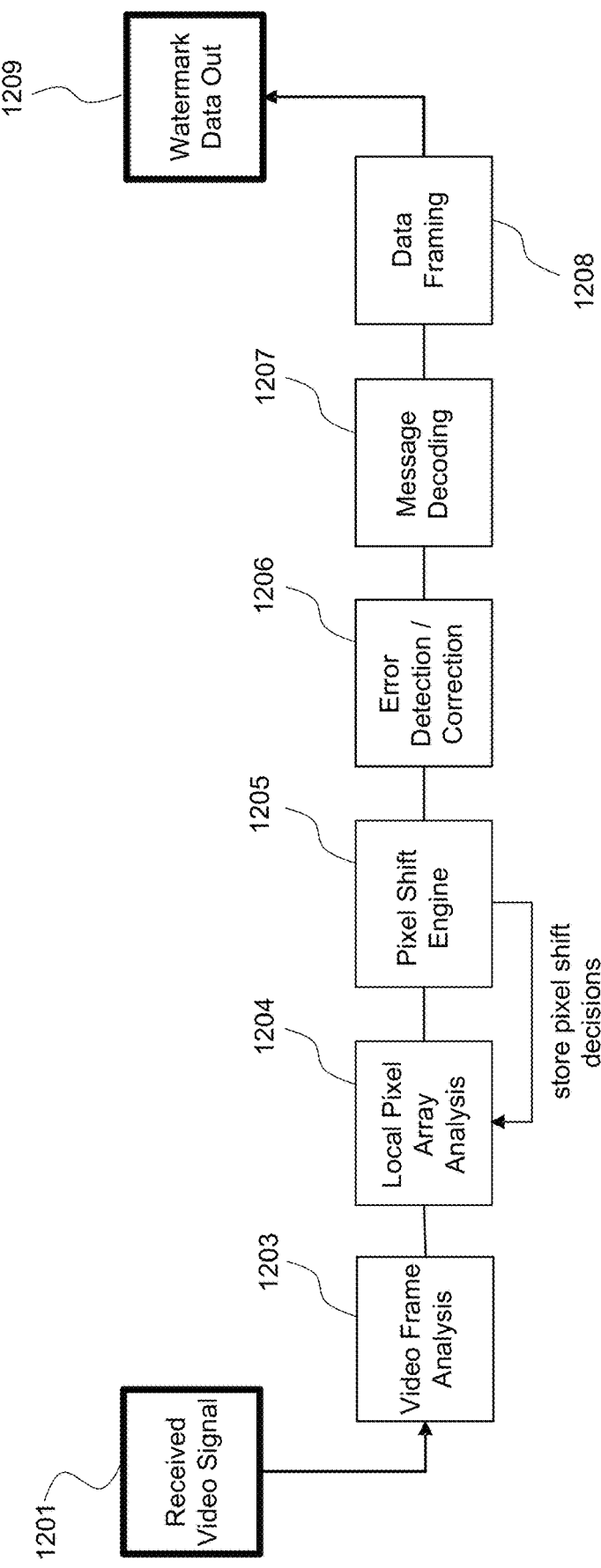
FIG. 12 is a decoding flow diagram illustrating a process of extracting the watermarked data from a video frame, in accordance with some examples provided herein.

FIG. 12 is a diagram illustrating an example of a watermark decoding system. The decoding process performed by the watermark decoding system is designed to be efficient in requiring relative low CPU resources when compared with other means of embedding data in visual images, such as perceptual hashing. The decoding process is largely the inverse of the encoding process. A video signal 1201 can be obtained or received (e.g., from a video headend, a storage device, a cloud server system, a streaming video service provider, or other source of encoded video), and a video frame analysis engine 1203 can analyze a video frame to identify one or more pixel regions of a video frame that are known to contain additional watermark data.

The local pixel array analysis engine 1204 can analyze each pixel region. For example, the average pixel characteristic value(s) (e.g., H, S, and/or L values) of the pixels within a pixel patch (e.g., pixel patch 102) can be determined and used to find an area of pixels whose pixel characteristic value(s) (e.g., H, S, and/or L) values are measurably offset from the average values of the pixels in the surrounding area (e.g., the white pixels shown in FIG. 2). In some cases, the original data carrying pixel area can be somewhat altered by the video encoding and decoding processes in the pipeline from the source of the watermarked video to the receiving that decodes the compressed digital video stream. Typically, the data area will be somewhat smeared and certainly will not have crisp boundaries. However, with a plurality of pixels horizontally (e.g., four, six, eight, or other number of pixels) representing a binary value, such as the six pixels used in the example shown in FIG. 2, enough information will survive to accurately decode the embedded watermark data. In some cases, at least two rows of pixels can be used for encoding the watermark signal (the additional watermark data) to accommodate video interlacing, as shown in FIG. 1 and FIG. 2.

The pixel shift engine 1205 can detect a pixel shift. For example, the pixel shift can be the measurement of the change in pixel value against the surrounding pixels in the target pixel watermark symbol area (e.g., the subset area shown in FIG. 1, or the core area and/or the intermediate area shown in FIG. 2, relative to the surrounding area). The local pixel array analysis engine 1204 can store the pixel shift decision. The error detection/correction engine 1206 can perform error detection and/or correction. Based on the pixel values of the subset of pixels within the pixel region, and based on any detected pixel shift, the message decoding engine 1207 can decode the message conveyed in the pixel regions. A data framing engine 1208 can prepare the video data for output, and at 1209, the watermark data is output.

Using the techniques described herein, watermark data can be applied to a digital video signal in order to embed additional data into the video signal. The watermark data can be easily decoded and processed by a media device in an efficient manner, without adding a large amount of data to the video. Using the above-described techniques, the embedded data conveys information related to the video, triggers a function, and/or allows other uses, while remaining invisible to the viewer of the displayed video. For example, FIG. 13 is an example of an image with multiple examples of data element locations, including a pixel region 1301 with a subset of pixels 1302 carrying data. FIG. 14 shows an enlarged version of the pixel region 1301 and the subset of pixels 1302. As can be seen from the larger image in FIG. 14, the modified pixel values in the subset of pixels 1302 is not visibly noticeable.

An illustrative example use of the digital video watermarking techniques described herein can include, by way of example only and without limitation, embedding a digital data code into a video picture (also referred to as a frame) to be used as a signal to a receiving device. In some cases, the digital watermark data can also be used for triggering events (e.g., for interactive television) as well as for dynamic content substitution. For instance, when the data code is received by the receiving device, the data code can cause the receiving device to substitute one video segment for the segment currently being received. The process of substituting one video segment for another can be referred to as dynamic content substitution. Dynamic content substitution can be used in many applications, such as gaming, movies, televisions shows, advertising, or other application. The substation of a certain television advertisement being broadcast as part of a television program with a different advertisement (e.g., one that has been predetermined to be more relevant for that household) can be referred to as dynamic ad insertion. Dynamic content substitution can be dynamic, in which case it will occur any time content that is eligible to be replaced is detected as currently being displayed by means of a process running inside of an enabled receiving device (e.g., a smart TV, set-top box, or other receiving device).

In one example, watermark data can be used at the start of an ad for a vehicle. The watermark data can act as a trigger for a process in a smart TV to substitute alternative content (e.g., a video, an alternative ad, content from the Internet, or other alternative content) based on demographic and/or user data provided to the TV. Alternative content could be stored in the memory of a set-top box, the smart TV, or other device, or could be available over the Internet to be downloaded on demand. For example, alternative content for an automotive brand could be better selected based on the type of vehicle promoted, depending on the demographics or area where the receiving device is located. In such an example, alternative content for compact cars might be sent to urban areas, alternative content for sport utility vehicles or minivans can be sent to suburban neighborhoods, and alternative content for pick-up trucks can be sent to rural locations with a dynamic content system (e.g., a dynamic advertising system) choosing which alternative content message to run by data embedded in the video preceding or at the point of insertion.

Another illustrative example use of the digital video watermarking techniques described herein is that the embedded data can trigger of an on-screen pop-up window, overlay, or other graphical element providing additional information relating to the underlying video content. For instance, additional information can be displayed for a product currently being displayed by the receiving device and/or display device. In some cases, the pop-up window, overlay, or other graphical element can provide a uniform resource locator (URL) link (or other selectable resource) to a website that includes information related to the content being displayed (e.g., a link to a website enabling a user to obtain a product), which can be accessible using a web browser in the receiving device (e.g., a smart TV, a set-top box, or other receiving device). In some examples, the embedded data can trigger the display of a quick response (QR) code on the display device (e.g., on a television monitor) such that a viewer can aim a camera or QR code reader of a mobile device to obtain the QR code data. In some cases, in response to obtaining the QR code data, an Internet browser can be launched on the mobile device, which can access the web address contained in the QR code. There are many other uses in addition to the above for taking advantage of an embedded, invisible watermark in one or more frames of a video stream that can be quickly decoded and hence provides tight synchronization with the video information.

Figure 15:
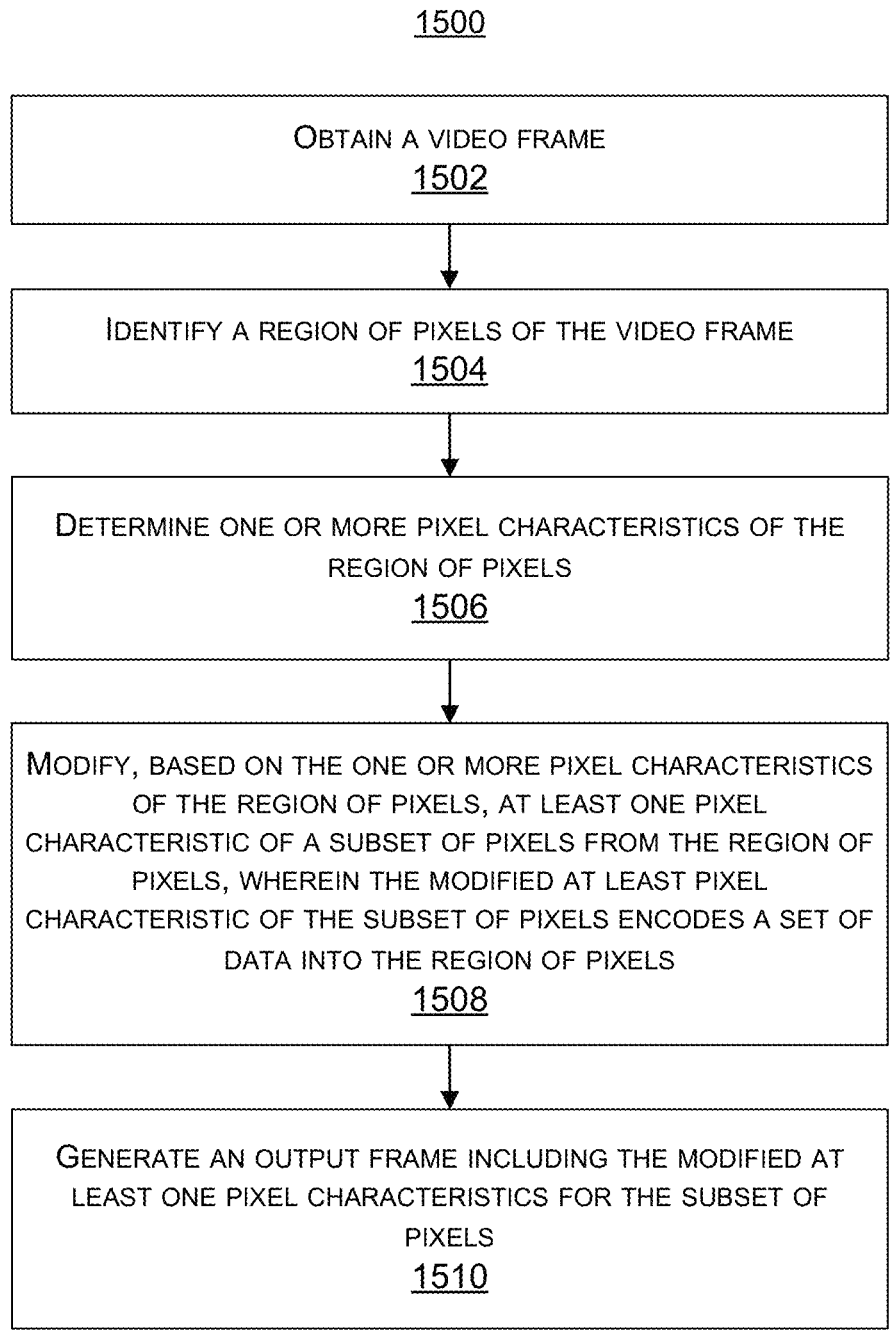
FIG. 15 is a flowchart illustrating an example of a process of processing video data, in accordance with some examples provided herein.

An example of a process performed using the techniques described herein will now be described. FIG. 15 is a flowchart illustrating an example of a process 1500 for processing video data. At block 1502, the process 1500 includes obtaining a video frame. At block 1504, the process 1500 includes identifying a region of pixels of the video frame. In one illustrative example, the region of pixels can include the pixel region 102 shown in FIG. 1.

At block 1506, the process 1500 includes determining one or more pixel characteristics of the region of pixels. In some cases, the one or more pixel characteristics can include at least one of a hue, a saturation, or a lightness of the region of pixels. For example, the one or more pixel characteristics can include a hue, a saturation, and a lightness of the region of pixels.

At block 1508, the process 1500 includes modifying, based on the one or more pixel characteristics of the region of pixels, at least one pixel characteristic of a subset of pixels from the region of pixels. In one illustrative example, the subset of pixels can include the subset of pixels (including gray pixel 103) shown in FIG. 1. In another illustrative example, the subset of pixels can include the core area (including dark gray pixel 205) shown in FIG. 1. In another illustrative example, the subset of pixels can include the intermediate area (including light gray pixel 203) shown in FIG. 1. The modified at least pixel characteristic of the subset of pixels encodes a set of data into the region of pixels. In some examples, the at least pixel characteristic of the subset of pixels can include at least one of a hue, a saturation, or a lightness of the region of pixels. For example, the at least pixel characteristic of the subset of pixels can include a hue, a saturation, and a lightness of the region of pixels.

In some examples, the process 1500 can include determining an average of the one or more pixel characteristics of the region of pixels, and scaling the averaged one or more pixel characteristics to obtain a scaled value. The process 1500 can further include determining, using the scaled value, an amount to modify the at least one pixel characteristic of the subset of pixels from the region of pixels, where the at least one pixel characteristic of the subset of pixels is modified by the determined amount.

At block 1510, the process 1500 includes generating an output frame including the modified at least one pixel characteristics for the subset of pixels. The output frame can be provided to a receiving device, which can decode the frame to obtain the encoded set of data from the region of pixels.

In some examples, at least pixel characteristic of an additional subset of pixels from an additional region of pixels in a subsequent video frame can be modified to encode the set of data into the additional region of pixels. The subsequent video frame has an output order after the video frame. In such examples, the additional region of pixels in the subsequent video frame is a different region than the region of pixels of the video frame.

In some examples, the process 1500 can include obtaining a subsequent video frame that has an output order after the video frame. The process 1500 can include identifying an additional region of pixels of the subsequent video frame, where the additional region of pixels is a different region than the region of pixels of the video frame. The process 1500 can further include determining one or more pixel characteristics of the additional region of pixels, and modifying, based on the one or more pixel characteristics of the additional region of pixels, at least one pixel characteristic of an additional subset of pixels from the additional region of pixels. The modified at least pixel characteristic of the additional subset of pixels encodes the set of data into the additional region of pixels. The process 1500 can further include generating an additional output frame including the modified at least one pixel characteristics for the additional subset of pixels.

In some examples, the process 1500 may be performed by a computing device or apparatus. The computing device can include any suitable device, such as a display device (e.g., a television), a broadcast receiver device, a set-top box, a camera, a personal computer, a mobile device, a tablet computer, a wearable device, or other device. The computing device can include the computing device architecture 1600 shown in FIG. 16. In one example, the process 1500 can be performed by a computing device with the computing device architecture 1600 implementing the watermark encoding system shown in FIG. 11. In some cases, the computing device or apparatus may include an input device, an encoding device, a decoding device, an output device (e.g., a display configured to display the video data such as a decoded version of the encoded video frame, a speaker, and/or other output device), one or more cameras, one or more processors implemented in circuitry, one or more microprocessors implemented in circuitry, one or more microcomputers implemented in circuitry, and/or other component that is configured to carry out the steps of process 1500. The computing device may further include a display, a network interface configured to communicate and/or receive the data, any combination thereof, and/or other component(s). The network interface may be configured to communicate and/or receive Internet Protocol (IP) based data or other type of data.

The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Process 1500 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 16:
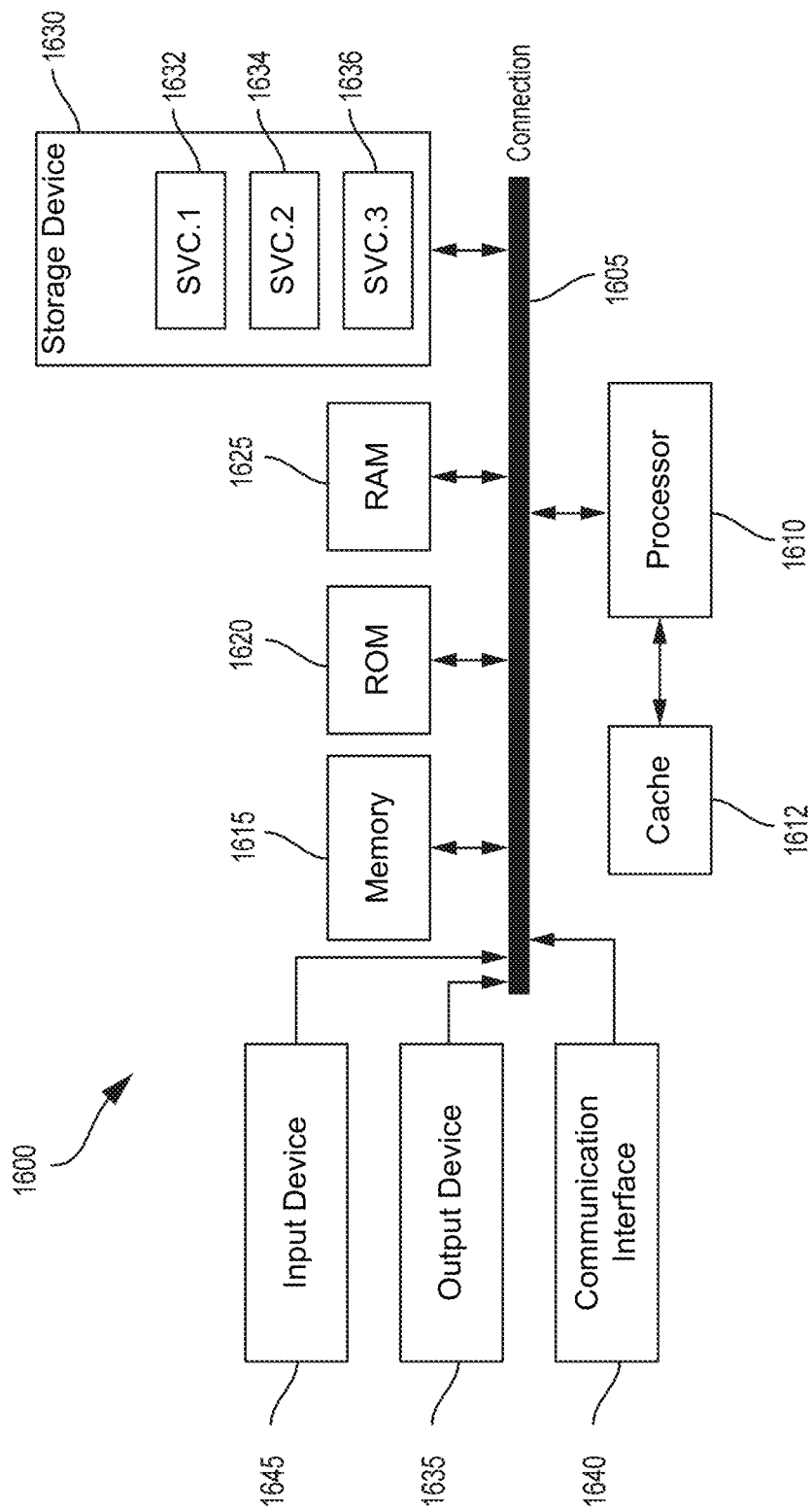
FIG. 16 is an example computing device architecture of an example computing device that can implement the various techniques described herein.

FIG. 16 illustrates an example computing device architecture 1600 of an example computing device which can implement the various techniques described herein. For example, the computing device architecture 1600 can implement the watermark encoding system shown in FIG. 11 and/or the watermark decoding system shown in FIG. 13. The components of computing device architecture 1600 are shown in electrical communication with each other using connection 1605, such as a bus. The example computing device architecture 1600 includes a processing unit (CPU or processor) 1610 and computing device connection 1605 that couples various computing device components including computing device memory 1615, such as read only memory (ROM) 1620 and random access memory (RAM) 1625, to processor 1610.

Computing device architecture 1600 can include a cache of high-speed memory connected directly with, in close proximity to, or integrated as part of processor 1610. Computing device architecture 1600 can copy data from memory 1615 and/or the storage device 1630 to cache 1612 for quick access by processor 1610. In this way, the cache can provide a performance boost that avoids processor 1610 delays while waiting for data. These and other modules can control or be configured to control processor 1610 to perform various actions. Other computing device memory 1615 may be available for use as well. Memory 1615 can include multiple different types of memory with different performance characteristics. Processor 1610 can include any general purpose processor and a hardware or software service, such as service 1 1632, service 2 1634, and service 3 1636 stored in storage device 1630, configured to control processor 1610 as well as a special-purpose processor where software instructions are incorporated into the processor design. Processor 1610 may be a self-contained system, containing multiple cores or processors, a bus, memory controller, cache, etc. A multi-core processor may be symmetric or asymmetric.

To enable user interaction with the computing device architecture 1600, input device 1645 can represent any number of input mechanisms, such as a microphone for speech, a touch-sensitive screen for gesture or graphical input, keyboard, mouse, motion input, speech and so forth. Output device 1635 can also be one or more of a number of output mechanisms known to those of skill in the art, such as a display, projector, television, speaker device, etc. In some instances, multimodal computing devices can enable a user to provide multiple types of input to communicate with computing device architecture 1600. Communications interface 1640 can generally govern and manage the user input and computing device output. There is no restriction on operating on any particular hardware arrangement and therefore the basic features here may easily be substituted for improved hardware or firmware arrangements as they are developed.

Storage device 1630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1625, read only memory (ROM) 1620, and hybrids thereof. Storage device 1630 can include services 1632, 1634, 1636 for controlling processor 1610. Other hardware or software modules are contemplated. Storage device 1630 can be connected to the computing device connection 1605. In one aspect, a hardware module that performs a particular function can include the software component stored in a computer-readable medium in connection with the necessary hardware components, such as processor 1610, connection 1605, output device 1635, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method of processing video data, comprising:
obtaining a video frame;
identifying a region of pixels of the video frame;
determining one or more pixel characteristics of the region of pixels of the video frame, the one or more pixel characteristics including at least one of a hue, a saturation, or a lightness of the region of pixels;
identifying a subset of pixels within the region of pixels, the subset of pixels including less pixels than the region and including a first set of pixel characteristic values;
determining an average of the one or more pixel characteristics of the region of pixels;
scaling the averaged one or more pixel characteristics to obtain a scaled value;
determining, using the scaled value, an amount to modify at least one pixel characteristic of the subset of pixels from the region of pixels;
encoding a set of data into the subset of pixels at least in part by modifying the at least one pixel characteristic of the subset of pixels by the determined amount, wherein based on modifying the at least one pixel characteristic by the determined amount, the subset of pixels include a second set of pixel characteristic values different from the first set of pixel characteristic values; and
generating an output frame including the modified at least one pixel characteristic for the subset of pixels.

2. The method of claim 1, wherein the one or more pixel characteristics of the region of pixels include a hue, a saturation, and a lightness of the region of pixels.

3. The method of claim 1, wherein the at least one pixel characteristic of the subset of pixels includes at least one of a hue, a saturation, or a lightness of the region of pixels.

4. The method of claim 1, wherein the at least one pixel characteristic of the subset of pixels includes a hue, a saturation, and a lightness of the region of pixels.

5. The method of claim 1, wherein the one or more pixel characteristics of the region of pixels include at least one of hue, a saturation, or a lightness of the region of pixels.

6. The method of claim 1, wherein at least one pixel characteristic of an additional subset of pixels from an additional region of pixels in a subsequent video frame are modified to encode the set of data into the additional region of pixels, the subsequent video frame having an output order after the video frame, and wherein the additional region of pixels in the subsequent video frame is a different region than the region of pixels of the video frame.

7. The method of claim 1, further comprising:
obtaining a subsequent video frame, the subsequent video frame having an output order after the video frame;
identifying an additional region of pixels of the subsequent video frame, wherein the additional region of pixels is a different region than the region of pixels of the video frame;
determining one or more pixel characteristics of the additional region of pixels;
modifying, based on the one or more pixel characteristics of the additional region of pixels, at least one pixel characteristic of an additional subset of pixels from the additional region of pixels, wherein the modified at least one pixel characteristic of the additional subset of pixels encodes the set of data into the additional region of pixels; and
generating an additional output frame including the modified at least one pixel characteristics for the additional subset of pixels.

8. An apparatus, comprising:
one or more processors implemented in circuitry; and
a non-transitory machine-readable storage medium including instructions, which when executed on the one or more processors, cause the one or more processors to perform operations including:
obtaining a video frame;
identifying a region of pixels of the video frame;
determining one or more pixel characteristics of the region of pixels of the video frame, the one or more pixel characteristics including at least one of a hue, a saturation, or a lightness of the region of pixels;
identifying a subset of pixels within the region of pixels, the subset of pixels including less pixels than the region and including a first set of pixel characteristic values;
determining an average of the one or more pixel characteristics of the region of pixels;
scaling the averaged one or more pixel characteristics to obtain a scaled value;
determining, using the scaled value, an amount to modify at least one pixel characteristic of the subset of pixels from the region of pixels;
encoding a set of data into the subset of pixels at least in part by modifying the at least one pixel characteristic of the subset of pixels by the determined amount, wherein based on modifying the at least one pixel characteristic by the determined amount, the subset of pixels include a second set of pixel characteristic values different from the first set of pixel characteristic values; and
generating an output frame including the modified at least one pixel characteristic for the subset of pixels.

9. The apparatus of claim 8, wherein the one or more pixel characteristics of the region of pixels include a hue, a saturation, and a lightness of the region of pixels.

10. The apparatus of claim 8, wherein the at least one pixel characteristic of the subset of pixels includes at least one of a hue, a saturation, or a lightness of the region of pixels.

11. The apparatus of claim 8, wherein the at least one pixel characteristic of the subset of pixels includes a hue, a saturation, and a lightness of the region of pixels.

12. The apparatus of claim 8, wherein the one or more pixel characteristics of the region of pixels include at least one of hue, a saturation, or a lightness of the region of pixels.

13. The apparatus of claim 8, wherein at least one pixel characteristic of an additional subset of pixels from an additional region of pixels in a subsequent video frame are modified to encode the set of data into the additional region of pixels, the subsequent video frame having an output order after the video frame, and wherein the additional region of pixels in the subsequent video frame is a different region than the region of pixels of the video frame.

14. The apparatus of claim 8, the non-transitory machine-readable storage medium including instructions, which when executed on the one or more processors, cause the one or more processors to perform operations including:
obtaining a subsequent video frame, the subsequent video frame having an output order after the video frame;
identifying an additional region of pixels of the subsequent video frame, wherein the additional region of pixels is a different region than the region of pixels of the video frame;

determining one or more pixel characteristics of the additional region of pixels;

modifying, based on the one or more pixel characteristics of the additional region of pixels, at least one pixel characteristic of an additional subset of pixels from the additional region of pixels, wherein the modified at least one pixel characteristic of the additional subset of pixels encodes the set of data into the additional region of pixels; and generating an additional output frame including the modified at least one pixel characteristics for the additional subset of pixels.

15. A non-transitory computer-readable medium having stored thereon instructions that, when executed by one or more processors, cause the one or more processors to:

obtain a video frame;

identify a region of pixels of the video frame;

determine one or more pixel characteristics of the region of pixels of the video frame, the one or more pixel characteristics including at least one of a hue, a saturation, or a lightness of the region of pixels;

identify a subset of pixels within the region of pixels, the subset of pixels including less pixels than the region and including a first set of pixel characteristic values;

determine an average of the one or more pixel characteristics of the region of pixels;

scale the averaged one or more pixel characteristics to obtain a scaled value;

determine, using the scaled value, an amount to modify at least one pixel characteristic of the subset of pixels from the region of pixels;

encode a set of data into the subset of pixels at least in part by modifying the at least one pixel characteristic of the subset of pixels by the determined amount, wherein based on modifying the at least one pixel characteristic by the determined amount, the subset of pixels include a second set of pixel characteristic values different from the first set of pixel characteristic values; and generate an output frame including the modified at least one pixel characteristic for the subset of pixels.

16. The non-transitory computer-readable medium of claim 15, wherein the at least one pixel characteristic of the subset of pixels includes at least one of a hue, a saturation, or a lightness of the region of pixels.

17. The non-transitory computer-readable medium of claim 15, wherein the one or more pixel characteristics of the region of pixels include at least one of hue, a saturation, or a lightness of the region of pixels.

18. The non-transitory computer-readable medium of claim 15, wherein at least one pixel characteristic of an additional subset of pixels from an additional region of pixels in a subsequent video frame are modified to encode the set of data into the additional region of pixels, the subsequent video frame having an output order after the video frame, and wherein the additional region of pixels in the subsequent video frame is a different region than the region of pixels of the video frame.

* * * * *